US012783717B2

(12) United States Patent
Ke et al.

(10) Patent No.: US 12,783,717 B2
(45) Date of Patent: Nov. 3, 2026

(54) INFORMATION PRIVACY PROTECTION METHOD AND APPARATUS, DEVICE, AND STORAGE MEDIUM

(71) Applicant: VIVO MOBILE COMMUNICATION CO., LTD., Dongguan (CN)

(72) Inventors: Xiaowan Ke, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 501 days.

(21) Appl. No.: 18/341,306

(22) Filed: Jun. 26, 2023

(65) Prior Publication Data

US 2023/0334172 A1 Oct. 19, 2023

Related U.S. Application Data

(63) Continuation of application No. PCT/CN2021/142410, filed on Dec. 29, 2021.

(30) Foreign Application Priority Data

Dec. 31, 2020 (CN) ........................ 202011635711.8

(51) Int. Cl.
*G06F 21/62* (2013.01)

(52) U.S. Cl.
CPC ................................ *G06F 21/6245* (2013.01)

(58) Field of Classification Search
CPC ............. G06F 21/6245; H04L 63/0281; H04L 63/0471; H04L 63/123; H04L 63/205; H04L 9/088; H04W 12/033; H04W 12/10
USPC ............................................................ 726/26
See application file for complete search history.

(56) References Cited

U.S. PATENT DOCUMENTS

| | | | | |
|---|---|---|---|---|
| 7,039,713 | B1 * | 5/2006 | Van Gunter | H04L 63/18 713/153 |
| 8,751,788 | B2 * | 6/2014 | Leach | G06F 21/6254 713/193 |
| 9,344,882 | B2 * | 5/2016 | Wan | H04M 1/724631 |
| 10,462,111 | B2 * | 10/2019 | Frankel | H04L 9/3297 |
| 11,354,448 | B2 * | 6/2022 | Yang | G06F 21/64 |
| 11,362,815 | B2 * | 6/2022 | Yang | H04L 9/3234 |

(Continued)

FOREIGN PATENT DOCUMENTS

| | | | |
|---|---|---|---|
| CN | 1291396 | A | 4/2001 |
| CN | 103596172 | A | 2/2014 |

(Continued)

OTHER PUBLICATIONS

Seiji Ura, "WO2000038382A1", "Communication system and communication method" Pub. Date: Jun. 29, 2000.*

(Continued)

*Primary Examiner* — Samson B Lemma

(57) ABSTRACT

This application discloses an information privacy protection method and apparatus, a device, and a storage medium, and pertains to the field of communications technologies. The method includes: sending first information, where the first information includes at least one of the following: first request information, where the first request information is used to request to perform a first privacy protection operation on information and/or data related to a terminal; capability information of the terminal; and privacy protection indication information.

18 Claims, 8 Drawing Sheets

(56) References Cited

U.S. PATENT DOCUMENTS

| | | | | |
|---|---|---|---|---|
| 11,632,676 B2 * | 4/2023 | Lee | H04W 76/12 | 726/4 |
| 11,778,459 B2 * | 10/2023 | Wu | H04W 12/043 | 455/411 |
| 11,792,172 B2 * | 10/2023 | Nair | H04L 63/0442 | 726/7 |
| 2002/0152269 A1 * | 10/2002 | Ichimura | G08G 1/0962 | 709/219 |
| 2012/0225640 A1 * | 9/2012 | Bosch | H04W 12/037 | 455/410 |
| 2015/0269318 A1 * | 9/2015 | Neff | G16H 10/60 | 705/3 |
| 2018/0324585 A1 * | 11/2018 | Nair | H04L 63/0442 | |
| 2019/0215693 A1 * | 7/2019 | Lee | H04L 63/205 | |
| 2020/0082115 A1 * | 3/2020 | Ball | H04L 63/0407 | |
| 2020/0177366 A1 * | 6/2020 | Han | H04L 9/3239 | |
| 2020/0184046 A1 * | 6/2020 | Li | G06F 21/31 | |
| 2021/0051005 A1 * | 2/2021 | Kunz | H04W 12/04 | |
| 2021/0168594 A1 * | 6/2021 | Wu | H04W 88/16 | |
| 2021/0219211 A1 * | 7/2021 | Ke | H04W 48/14 | |
| 2021/0326485 A1 * | 10/2021 | Yang | H04L 9/0897 | |
| 2021/0328780 A1 * | 10/2021 | Yang | H04L 63/108 | |
| 2022/0263672 A1 * | 8/2022 | Zhang | H04L 63/10 | |
| 2023/0077297 A1 * | 3/2023 | Fu | H04W 4/40 | |

FOREIGN PATENT DOCUMENTS

| | | | |
|---|---|---|---|
| CN | 103701778 | A | 4/2014 |
| CN | 103986728 | A | 8/2014 |
| CN | 111079939 | A | 4/2020 |
| CN | 111557083 | A | 8/2020 |
| EP | 1058429 | A1 | 12/2000 |
| WO | 2019/139852 | A1 | 7/2019 |

OTHER PUBLICATIONS

European Patent Office, Supplementary European Search Report issued in corresponding Application No. EP 21914481 dated May 14, 2024.

Fourth Office Action dated Mar. 31, 2026 received in corresponding patent family application No. CN202011635711.8. English translation attached.

Third Office Action dated Jan. 4, 2026 received in corresponding patent family application No. CN202011635711.8. English translation attached.

* cited by examiner

INFORMATION PRIVACY PROTECTION METHOD AND APPARATUS, DEVICE, AND STORAGE MEDIUM

CROSS-REFERENCE TO RELATED APPLICATIONS

This application is a continuation of International Application No. PCT/CN2021/142410, filed on Dec. 29, 2021, which claims priority to Chinese Patent Application No. 202011635711.8, filed on Dec. 31, 2020 in China, which is incorporated herein by reference in its entirety.

TECHNICAL FIELD

This application pertains to the field of communications technologies, and in particular relates to an information privacy protection method and apparatus, a device, and a storage medium.

BACKGROUND

For distributed computing, such as cloud computing, the purpose of computing is to be satisfied on the one hand, and privacy of a data source is to be protected on the other hand. A protection algorithm needs to be performed on original data to implement information privacy protection, which is complicated to some extent. In addition, an amount of data after privacy protection may be greater than an amount of original data, resulting in transmission pressure on an intermediate route. Therefore, how to protect privacy while reducing complexity and a transmission amount of a data source is a problem that needs to be resolved.

SUMMARY

According to a first aspect of the present disclosure, an information privacy protection method is provided, where the method is applied to a first communications device and includes:

sending first information, where the first information includes at least one of the following:

first request information, where the first request information is used to request to perform a first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal.

According to a second aspect of the present disclosure, an information privacy protection method is provided, where the method is applied to a second communications device and includes:

obtaining first information and/or subscription information related to a first privacy protection operation; and determining, according to the first information and/or the subscription information related to the first privacy protection operation, to send second request information or not to send second request information, where the second request information is used to request policy information of the first privacy protection operation; and the first information includes at least one of the following:

first request information, where the first request information is used to request to perform the first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal.

According to a third aspect of the present disclosure, an information privacy protection method is provided, where the method is applied to a third communications device and includes:

obtaining second information; and determining policy information of a first privacy protection operation according to the second information, where the second information includes one of the following:

first information;

second request information; and subscription information related to the first privacy protection operation, where the first information includes at least one of the following:

first request information, where the first request information is used to request to perform the first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal; and the second request information is used to request the policy information of the first privacy protection operation.

According to a fourth aspect of the present disclosure, an information privacy protection method is provided, where the method is applied to a fourth communications device and includes:

obtaining policy information of a first privacy protection operation; and performing a third operation according to the policy information of the first privacy protection operation, where the third operation includes at least one of the following:

installing the policy information of the first privacy protection operation; and performing the first privacy protection operation on information and/or data related to a terminal.

According to a fifth aspect of the present disclosure, an information privacy protection method is provided, where the method is applied to a fifth communications device and includes:

obtaining third request information, where the third request information is used to request subscription information related to a first privacy protection operation; and sending, according to the third request information, the subscription information related to the first privacy protection operation.

According to a sixth aspect of the present disclosure, an information privacy protection method is provided, where the method is applied to a sixth communications device and includes:

obtaining first privacy protection service support indication information; and generating first request information according to the first privacy protection service support indication information, where the first request information is used to request to perform a first privacy protection operation on information and/or data related to a terminal.

According to a seventh aspect of the present disclosure, an information privacy protection method is provided, where the method is applied to a seventh communications device and includes:

obtaining first privacy protection start information; and sending information and/or data of a target object according to the first privacy protection start information, where the first privacy protection start information includes at least one of the following: indication information used to indicate that first privacy protection starts, and the description information of the target object protected by first privacy protection;

the target object includes at least one of the following: a terminal, a target service, target information, target data, a target data channel, and a target computing task; and the description information of the target object includes at least one of the following: description information of the terminal, description information of the target service, description information of the target information, description information of the target data, description information of the target data channel, and description information of the target computing task.

According to an eighth aspect of the present disclosure, an information privacy protection apparatus is provided, where the method is applied to a first communications device and includes:

a first sending unit, configured to send first information, where the first information includes at least one of the following: first request information, where the first request information is used to request to perform a first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal.

According to a ninth aspect of the present disclosure, an information privacy protection apparatus is provided, where the method is applied to a second communications device and includes:

a second obtaining unit, configured to obtain first information and/or subscription information related to a first privacy protection operation; and a first determining unit, configured to determine, according to the first information and/or the subscription information related to the first privacy protection operation, to send second request information or not to send second request information, where the second request information is used to request policy information of the first privacy protection operation; and the first information includes at least one of the following:

first request information, where the first request information is used to request to perform the first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal.

According to a tenth aspect of the present disclosure, an information privacy protection apparatus is provided, where the method is applied to a third communications device and includes:

a third obtaining unit, configured to obtain second information; and a second determining unit, configured to determine policy information of a first privacy protection operation according to the second information, where the second information includes one of the following:

first information;

second request information; and subscription information related to the first privacy protection operation, where the first information includes at least one of the following:

first request information, where the first request information is used to request to perform the first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal; and the second request information is used to request the policy information of the first privacy protection operation.

According to an eleventh aspect of the present disclosure, an information privacy protection apparatus is provided, where the method is applied to a fourth communications device and includes:

a fourth obtaining unit, configured to obtain policy information of a first privacy protection operation; and a fourth execution unit, configured to perform a third operation according to the policy information of the first privacy protection operation, where the third operation includes at least one of the following:

installing the policy information of the first privacy protection operation; and performing the first privacy protection operation on information and/or data related to a terminal.

According to a twelfth aspect of the present disclosure, an information privacy protection apparatus is provided, where the method is applied to a fifth communications device and includes:

a fifth obtaining unit, configured to obtain third request information, where the third request information is used to request subscription information related to a first privacy protection operation; and a fifth sending unit, configured to send, according to the third request information, the subscription information related to the first privacy protection operation.

According to a thirteenth aspect of the present disclosure, an information privacy protection apparatus is provided, where the method is applied to a sixth communications device and includes:

a sixth obtaining unit, configured to obtain first privacy protection service support indication information; and a first generation unit, configured to generate first request information according to the first privacy protection service support indication information, where the first request information is used to request to perform a first privacy protection operation on information and/or data related to a terminal.

According to a fourteenth aspect of the present disclosure, an information privacy protection apparatus is provided, where the method is applied to a seventh communications device and includes:

a seventh obtaining unit, configured to obtain first privacy protection start information; and a seventh sending unit, configured to send information and/or data of a target object according to the first privacy protection start information, where the first privacy protection start information includes at least one of the following: indication information used to indicate that first privacy protection starts, and the description information of the target object protected by first privacy protection;

the target object includes at least one of the following: a terminal, a target service, target information, target data, a target data channel, and a target computing task; and the description information of the target object includes at least one of the following: description information of the terminal, description information of the target service, description information of the target information, description information of the target data, description information of the target data channel, and description information of the target computing task.

According to a fifteenth aspect of the present disclosure, a terminal is provided. The terminal includes a processor, a memory, and a program or an instruction that is stored in the memory and that can be run on the processor, where the program or the instruction is executed by the processor to implement the steps of the method in the first aspect, or the steps of the method in the sixth aspect, or the steps of the method in the seventh aspect.

According to a sixteenth aspect of the present disclosure, a network side device is provided. The network side device includes a processor, a memory, and a program or an instruction that is stored in the memory and that can be run on the processor, where the program or the instruction is executed by the processor to implement the steps of the method in the first aspect, or the steps of the method in the second aspect, or the steps of the method in the third aspect, or the steps of the method in the fourth aspect, or the steps of the method in the fifth aspect.

According to a seventeenth aspect of the present disclosure, a readable storage medium is provided. The readable storage medium stores a program or an instruction, and the program or the instruction is executed by a processor to implement the steps of the method in the first aspect, or the steps of the method in the second aspect, or the steps of the method in the third aspect, or the steps of the method in the fourth aspect, or the steps of the method in the fifth aspect, or the steps of the method in the sixth aspect, or the steps of the method in the seventh aspect.

According to an eighteenth aspect of the present disclosure, a chip is provided. The chip includes a processor and a communications interface, the communications interface is coupled to the processor, and the processor is configured to run a program or an instruction to implement the method in the first aspect, or the method in the second aspect, or the method in the third aspect, or the method in the fourth aspect, or the method in the fifth aspect, or the method in the sixth aspect, or the method in the seventh aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

In the embodiments of this application, the word such as "example" or "for example" is used to represent giving an example, an illustration, or a description. Any embodiment or design scheme described as "an example of" or "for example" in the embodiments of this application should not be explained as being more preferred or having more advantages than another embodiment or design scheme. Exactly, use of the term "example" or "for example" is intended to present a concept in a specific manner.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a new radio (NR) system for example purposes, and NR terms are used in most of the following descriptions, although these technologies can also be applied to an application other than an NR system application, for example, a $6^{th}$ generation (6G) communications system.

Figure 1:
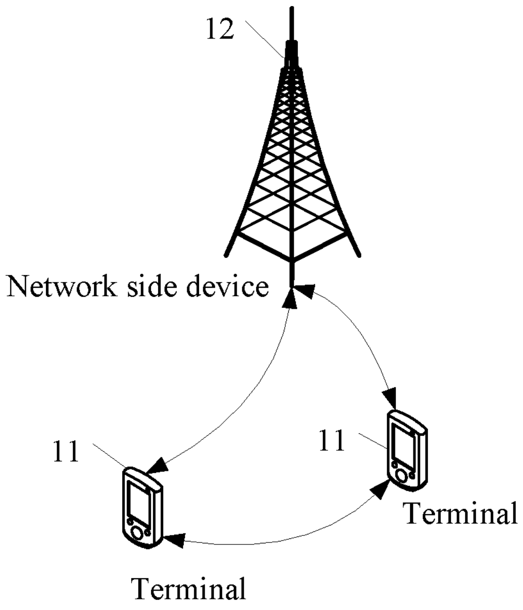
FIG. 1 is a block diagram of a wireless communications system to which embodiments of this application can be applied.

FIG. 1 is a block diagram of a wireless communications system to which embodiments of this application can be applied. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission reception point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

In the embodiments of this application, optionally, obtaining may be understood as obtaining from a configuration, receiving, receiving through a request, obtaining through self-learning, deriving from unreceived information, or obtaining after processing based on received information. This may be determined based on an actual requirement, and is not limited in the embodiments of this application. For example, when indication information of a capability sent by a device is not received, it may be deduced that the device does not support the capability.

Optionally, sending may include broadcasting, broadcasting in a system message, and returning after responding to a request.

In an embodiment of this application, a data channel may include but is not limited to one of the following: a protocol data unit (PDU) session, a public data network (PDN) connection, a quality of service (QoS) flow, a bearer, and an Internet Protocol security (IPsec) channel, where the bearer may be an evolved radio access bearer (E-RAB), a radio access bearer (RAB), a data radio bearer (DRB), a signaling radio bearer (SRB), or the like.

In an optional embodiment of this application, a communications device may include at least one of the following: a communications network element and a terminal.

In an embodiment of this application, the communications network element may include at least one of the following: a core network element and a radio access network element.

In the embodiments of this application, the core network (CN) element may include but is not limited to at least one of the following: a core network device, a core network node, a core network function, a core network element, a mobility management entity (MME), an access management function (AMF), a session management function (SMF), a user plane function (UPF), a serving gateway (SGW), a PDN gateway (PGW), a policy control function (PCF), a policy and charging rules function (PCRF), a serving GPRS support node (SGSN), a gateway GPRS support node (GGSN), a unified data management (UDM), a unified data repository (UDR), a home subscriber server (HSS), an application function (AF), and a centralized network configuration (CNC).

In the embodiments of this application, the radio access network (RAN) element may include but is not limited to at least one of the following: a radio access network device, a radio access network node, a radio access network function, a radio access network unit, a Third Generation Partnership Project (3GPP) radio access network, a non-3GPP radio access network, a centralized unit (CU), a distributed unit (DU), a base station, an evolved NodeB (eNB), a 5G base station (gNB), a radio network controller (RNC), a base station (NodeB), a non-3GPP interworking function (N3IWF), an access control (AC) node, an access point (AP) device, a wireless local area network (WLAN) node, and an N3IWF. Scenario 1: For distributed computing such as cloud computing, the purpose of computing is to be satisfied, and privacy of a data source is also to be protected. Scenario 2: For current artificial intelligence, UE information needs to be collected to predict a user behavior. Prediction is expected to be met, and privacy of a data source is also expected to be protected.

For privacy protection, a privacy protection algorithm needs to be performed on original data. If privacy protection is performed on a data source such as a terminal, relatively high complexity is imposed for the terminal. In addition, an amount of data obtained after privacy protection may be greater than an amount of original data, which causes transmission pressure on an intermediate route. When the terminal accesses a server by using a mobile communications network, an amount of increased transmitted data occupies too much radio spectrum resources. Therefore, the following problems need to be resolved:

Problem 1: How to protect privacy while reducing complexity and a transmission amount of the data sourced.

In one solution, the communications network performs privacy protection on data instead of the terminal. That is, the terminal sends the original data to the communications network, and after performing privacy protection, the communications network sends the original data to the server. After the server completes an operation, data obtained after the operation is sent to the communications network. After the communications network removes privacy protection from the data obtained after the operation, data obtained after the privacy protection removal is sent to the terminal.

Problem 2: Privacy protection needs to be performed by the communications network. However, the communications network does not know which data on which terminals requires privacy protection.

In one solution, the network is requested by the terminal or a service party agent. After the network generates a privacy protection policy, a privacy protection execution network element identifies data and performs privacy protection.

In another solution, the terminal or the service side directly subscribes to which data that requires privacy protection, and saves subscription data on which privacy protection is performed in the network.

Problem 3: During data collection, the terminal fixes privacy information in the network. When information of some data types is collected, the network needs to perform privacy negotiation.

For example, when a third party needs to collect location information of UE, the network determines, according to a privacy context of the UE, whether to perform privacy protection on the information before disclosing the information to the third party.

The privacy context of the UE may be saved in the network, or may be obtained after the UE is queried.

The privacy context includes whether to allow a plaintext text of the information to be synchronized to the third party.

In an optional embodiment of this application, first privacy protection is a security method in which an operation is performed after privacy protection is performed on data, and privacy protection can still be removed to obtain computed data.

In an optional embodiment of this application, an object includes at least one of the following: a terminal, a service, information, data, a data channel, and a computing task. The object is an object of the terminal. For example, a first object is a first object of the terminal. For example, a second object is a second object of the terminal. For example, a target object is a target object of the terminal.

In an optional embodiment of this application, description information of the service includes at least one of the following: service type information, a fully qualified domain name (FQDN), a source IP address, a target IP address, a source port, a target end, a protocol number, a Media Access Control (MAC) address, a target MAC address, a service application (APP) identifier, an operating system (OS) identifier, a packet detection rule (PDR), and a data network name (DNN). For all items included in description information of a first service, description information of a second service, and description information of a target service, refer to the description information of the service.

In an optional embodiment of this application, description information of the information includes at least one of the following: an information type (for example, location information) and an information identifier. For all items included in description information of first information, description information of second information, and description information of target information, refer to the description information of the information.

In an optional embodiment of this application, description information of the data includes at least one of the following: a data type, a data identifier, a fully qualified domain name (FQDN), a source IP address, a target IP address, a source port, a target end, a protocol number, a Media Access Control (MAC) address, a target MAC address, a service application (APP) identifier, an operating system (OS) identifier, a packet detection rule (PDR), and a data network name (DNN). For all items included in description information of first data, description information of second data, and description information of target data, refer to the description information of the data.

In an optional embodiment of this application, description information of the data channel includes at least one of the following: a channel type (such as a QoS flow, a DRB, or a PDU session) of the data channel, and an identifier (such as a PDU session identifier, a QoS flow identifier, or a DRB identifier) of the data channel. For all items included in description information of a first data channel, description information of a second data channel, and description information of a target data channel, refer to the description information of the data channel.

In an optional embodiment of this application, description information of the computing task includes at least one of the following: an identifier of the computing task and a computing power requirement of the computing task. For all items included in description information of a first computing task, description information of a second computing task, and description information of a target computing task, refer to the description information of the computing task.

In an optional embodiment of this application, description information of the terminal includes an identifier of the terminal (such as a network external identifier (for example, a generic public subscription identifier (GPSI)), a mobile phone number (for example, a mobile subscriber international ISDN number (MSISDN)), or a network internal identifier (for example, Subscription Permanent Identifier (SUPI), an international mobile subscriber identification number (IMSI)).

In an optional embodiment of the present application, the computing power requirement includes computing power resources that need to be consumed to complete the computing task.

In an optional embodiment of the present application, a computing power may be represented by at least one of the following:

floating point operations (flops);

cores of a processor;

a multiply accumulate operation (MAC);

cores of a graphics processing unit;

a dominant frequency of the processor/the graphics processing unit;

a frequency multiplication of the processor/the graphics processing unit;

an integer unit of the processor/the graphics processing unit;

a floating point unit of the processor/the graphics processing unit; and an output speed for computing a hash function.

In an optional embodiment of the present application, computing power requirement information includes at least one of the following:

required floating point operations;

required cores of the processor;

a required multiply accumulate operation;

required cores of the graphics processing unit;

a required dominant frequency of the processor/the graphics processing unit;

a required frequency multiplication of the processor/the graphics processing unit;

a required integer unit of the processor/the graphics processing unit;

a required floating point unit of the processor/the graphics processing unit; and a required output speed for computing the hash function.

In an optional embodiment of the present application, the server includes at least one of the following:

a computing power server, where the computing power server is configured to provide a computing power (including an edge computing power server) for a computing task and/or a service;

an application server (including an edge application server (EAS));

a server that provides a computing resource (including an edge computing resource server); and a server that provides a computing capability (including an edge computing capability server).

In an optional embodiment of this application, the computing task may include a computing power task. The computing power task may include a computing task that needs to be completed by consuming a specified computing power.

In an optional embodiment of this application, an algorithm for privacy protection includes but is not limited to one of the following: homomorphic encryption, differential privacy, a garbled circuit, and secret sharing.

In an optional embodiment of this application, the subscription information related to the first privacy protection operation includes at least one of the following:

allowing and/or requiring first privacy protection;

not allowing and/or not requiring first privacy protection;

description information of an object allowing and/or requiring first privacy protection; and description information of an object not allowing and/or not requiring first privacy protection.

With reference to the accompanying drawings, an information privacy protection method provided in the embodiments of this application is described in detail by using specific embodiments and application scenarios.

Figure 2:
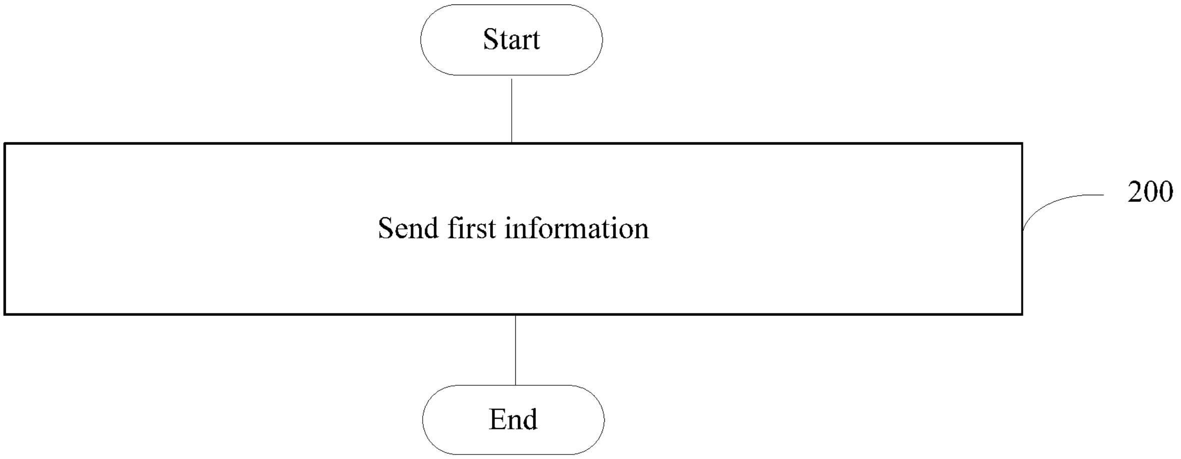
FIG. 2 is a first schematic flowchart of an information privacy protection method according to an embodiment of this application.

FIG. 2 is a first schematic flowchart of an information privacy protection method according to an embodiment of this application. The method is applied to a first communications device, and the first communications device may include but is not limited to one of the following: UE, an AF network element, and a CN network (for example, an SMF). As shown in FIG. 2, the method includes the following steps:

Step 200: Send first information.

In an implementation manner, the AF network element or the UE sends the first information to a policy control function (PCF) network element.

In an implementation manner, the AF network element or the UE sends the first information to the SMF network element.

In an implementation manner, the SMF network element sends the first information to the PCF network element.

Optionally, the first information includes at least one of the following:

first request information;

capability information of a terminal; and privacy protection indication information.

The first request information is used to request to perform a first privacy protection operation on information and/or data related to the terminal.

First privacy protection is a security method in which an operation is performed after privacy protection is performed on data, and privacy protection can still be removed to obtain computed data.

For example, privacy protection is performed on data sent by the terminal, to obtain data, on which privacy protection has been performed, of the terminal, an operation is performed, and then a server sends, to the terminal, computed data obtained after privacy protection removal is performed on an operation result.

The capability information of the terminal is used to indicate that the terminal has a capability of performing privacy protection on information and/or data, or that the terminal has no capability of performing privacy protection on information and/or data.

The privacy protection indication information is used to indicate that privacy protection has been performed on the information and/or the data related to the terminal, or is used to indicate that no privacy protection has been performed on the information and/or the data related to the terminal.

It can be understood that, according to the first information, the PCF network element or the SMF network element may obtain at least one piece of the following information: an object on which first privacy protection is to be performed, that is, the information and/or the data related to the terminal; whether the terminal has a privacy protection capability; and whether privacy protection has been performed on the information and/or the data related to the terminal.

In this embodiment of this application, a first communications device sends first information, where the first information reflects at least one of an object on which first privacy protection is to be performed, whether a terminal has a privacy protection capability, and whether privacy protection has been performed on information and/or data related to the terminal, so that privacy protection can be performed by a communications network. In this way, complexity and a transmission amount of a data source are reduced while protecting privacy.

Optionally, the first request information includes at least one of the following:

first indication information;

description information of the first object; and a direction in which the first privacy protection operation is requested.

The first indication information is used to request to perform the first privacy protection operation on information and/or data of the first object, where the first object includes at least one of the following: a terminal, a first service, first information, first data, a first data channel, and a first computing task.

When the first object is the terminal, first privacy protection is requested to be performed on all information and/or information of the terminal.

In an implementation manner, the first service may be a type of the first service. The first information may be a type of the first information. The first data may be a type of the first data.

The first data channel may be a DRB, a PDU session, a QoS flow, or the like.

The description information of the first object includes at least one of the following: description information of the terminal, description information of the first service, description information of the first information, description information of the first data, description information of the first data channel, and description information of the first computing task.

In an implementation, when the first object is the terminal, the description information of the first object is the description information of the terminal.

In an implementation, when the first object is the first service, the description information of the first object is the description information of the first service.

Optionally, the description information of the first service includes at least one of the following: service type information, an FQDN, a source IP address, a target IP address, a source port, a target end, a protocol number, a source MAC address, a target MAC address, an APP identifier of a service, an OS identifier, a PDR, and a DNN.

In an implementation, when the first object is the first information, the description information of the first object is the description information of the first information.

In an implementation, when the first object is the first data, the description information of the first object is the description information of the first data.

In an implementation, when the first object is the first data channel, the description information of the first object is the description information of the first data channel.

Optionally, the description information of the first data channel includes at least one of the following: an identifier of the first data channel, such as a PDU session identifier, a QoS flow identifier, or a DRB identifier.

In an implementation, when the first object is the first computing task, the description information of the first object is the description information of the first computing task.

The direction in which the first privacy protection operation is requested is used to request to perform the first privacy protection operation on information and/or data conforming to the direction in which the first privacy protection operation is requested.

In an implementation, the direction in which the first privacy protection operation is requested includes at least one of the following: an uplink and a downlink.

Optionally, the first privacy protection operation includes at least one of the following:

a privacy protection operation; and a privacy protection removal operation.

Optionally, the privacy protection operation includes at least one of the following:

encrypting information and/or data;

performing integrity protection on information and/or data;

scrambling information and/or data; and processing information and/or data by using a privacy protection algorithm;

and/or the privacy protection removal operation includes at least one of the following:

decrypting information and/or data;

performing integrity protection removal on information and/or data;

descrambling information and/or data; and performing privacy protection removal on information and/or data on which privacy protection has been performed.

Optionally, the privacy protection algorithm includes at least one of the following: homomorphic encryption, differential computing, a garbled circuit, and secret sharing.

Optionally, the direction in which the first privacy protection operation is requested includes at least one of the following:

a direction in which privacy protection is requested, to request to perform a privacy protection operation on information and/or data conforming to the direction in which privacy protection is requested; and a direction in which privacy protection removal is requested, to request to perform a privacy protection removal operation on information and/or data conforming to the direction in which privacy protection removal is requested.

In an implementation, the direction in which privacy protection is requested includes at least one of the following: an uplink and a downlink.

The uplink is from the terminal to the network, and the downlink is to from the network to the terminal.

In an implementation, the direction in which privacy protection removal is requested includes at least one of the following: an uplink and a downlink.

In an implementation, a privacy protection direction includes at least one of the following: an uplink and a downlink.

In an implementation, a privacy protection removal direction includes at least one of the following: an uplink and a downlink.

Optionally, the privacy protection direction includes at least one of the following:

an encryption direction used to instruct to perform an encryption operation on information and/or data conforming to the encryption direction;

a scrambling direction used to instruct to perform a scrambling operation on information and/or data conforming to the scrambling direction; and an integrity protection direction used to instruct to perform an integrity protection operation on information and/or data conforming to the integrity protection direction.

Optionally, the privacy protection removal direction includes at least one of the following:

a decryption direction used to instruct to perform an encryption operation on information and/or data conforming to the encryption direction;

a descrambling direction used to instruct to perform a scrambling operation on information and/or data conforming to the scrambling direction; and an integrity protection removal direction used to instruct to perform an integrity protection operation on information and/or data conforming to the integrity protection direction.

Optionally, the sending first information includes:

sending the first request information in a case that a first condition is met.

Optionally, the first communications device sends the first information when the first condition is met, where the first information is the first request information.

The first condition includes at least one of the following:

information and/or data of a first object need/needs to be disclosed to a first target end;

the information and/or the data of the first object need/needs to be sent to the first target end for computing;

a network supports performing the first privacy protection operation on the information and/or the data related to the terminal; and the terminal allows the network to perform the first privacy protection operation on the information and/or the data related to the terminal.

In an implementation, the first target end includes a server that provides a computing power, for example, a server that provides a computing power for a computing task or a service of the terminal. A computing requirement of the computing task or the service of the terminal may be completely or partially offloaded to the first target end.

In this embodiment of this application, a first communications device sends first request information in a case that a first condition is met, so that privacy protection can be performed by a communications network. In this way, privacy can be protected while reducing complexity and a transmission amount of a data source.

In some optional embodiments, after the step of sending first information, the method further includes:

obtaining first response information and/or first privacy protection start information; and performing one of the following according to the first response information and/or the first privacy protection start information:

sending information and/or data of a first object; and sending information and/or data of a target object.

Optionally, after sending the first information, the first communications device obtains the first response information and/or the first privacy protection start information, and sends the information and/or the data of the first object or the information and/or the data of the target object according to the first response information and/or the first privacy protection start information.

The first response information includes at least one of the following: a success response to the first request information, and description information of the target object protected by first privacy protection;

the first privacy protection start information includes at least one of the following: indication information used to indicate that first privacy protection starts, and the description information of the target object protected by first privacy protection;

the target object includes at least one of the following: a terminal, a target service, target information, target data, a target data channel, and a target computing task; and the description information of the target object includes at least one of the following: description information of the terminal, description information of the target service, description information of the target information, description information of the target data, description information of the target data channel, and description information of the target computing task; and the target object is the same as or different from the first object.

It is not difficult to understand that, in a scenario, the network may determine the target object according to the first request information submitted by the terminal and/or an application function. For the terminal, the target object may be more than the first object. In another scenario, when the terminal requests to provide the first request information for a plurality of first objects, the network can provide privacy protection for only a part of the first objects according to subscription of the terminal. In this case, for the terminal, the target object may be less than the first object. In a third scenario with reference to the foregoing two scenarios, there may be an overlapping part and/or a disjoint part between the target object and the first object.

In this embodiment of this application, after obtaining first response information and/or first privacy protection start information, a first communications device sends related information and/or data, so that privacy protection can be performed by a communications network. In this way, privacy can be protected while reducing complexity and a transmission amount of a data source.

Figure 3:
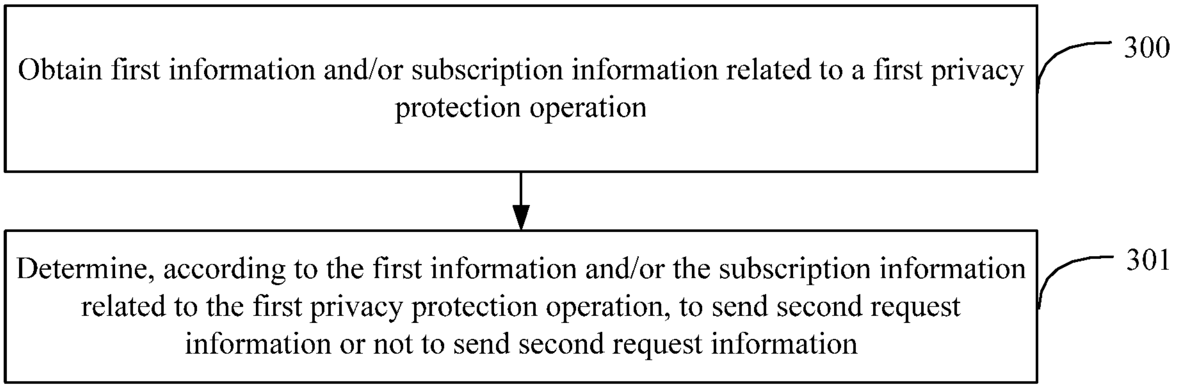
FIG. 3 is a second schematic flowchart of an information privacy protection method according to an embodiment of this application.

FIG. 3 is a second schematic flowchart of an information privacy protection method according to an embodiment of this application. The method is applied to a second communications device, and the second communications device may include but is not limited to a CN network element (for example, an SMF network element). As shown in FIG. 3, the method includes the following steps:

Step 300: Obtain first information and/or subscription information related to a first privacy protection operation.

Optionally, the second communications device obtains the first information and/or the subscription information related to the first privacy protection operation.

The first information includes at least one of the following:

- first request information, where the first request information is used to request to perform the first privacy protection operation on information and/or data related to a terminal;
- capability information of the terminal, where the capability information of the terminal is used to indicate that the terminal has a capability of performing privacy protection on information and/or data, or that the terminal has no capability of performing privacy protection on information and/or data; and
- privacy protection indication information, where the privacy protection indication information is used to indicate that privacy protection has been performed on the information and/or the data related to the terminal, or is used to indicate that no privacy protection has been performed on the information and/or the data related to the terminal.

Optionally, the subscription information related to the first privacy protection operation may be configured by an operator, or may be obtained from a unified data management (UDM) network element.

Optionally, the subscription information related to the first privacy protection operation includes at least one of the following:

- allowing and/or requiring first privacy protection;
- not allowing and/or not requiring first privacy protection;
- description information of an object allowing and/or requiring first privacy protection; and
- description information of an object not allowing and/or not requiring first privacy protection.

In an implementation, the subscription information of the first privacy protection operation is subscription information of a terminal, a service provider, and/or a third party to the first privacy protection operation.

Step 301: Determine, according to the first information and/or the subscription information related to the first privacy protection operation, to send second request information or not to send second request information.

Optionally, the second communications device determines, according to the first information and/or the subscription information related to the first privacy protection operation, whether to send the second request information to a third communications device.

The second request information is used to request the policy information of the first privacy protection operation.

In this embodiment of this application, a second communications device determines, according to first information and/or subscription information related to a first privacy protection operation, whether to send policy information used to request the first privacy protection operation, so that privacy protection can be performed by a communications network.

Optionally, the determining to send second request information includes:

- in a case that a second condition is met, determining to send the second request information.

Optionally, the second communications device determines, according to the first information and/or the subscription information related to the first privacy protection operation, whether the second condition is met, and in a case that the second condition is met, determines to send the second request information to the third communications device.

The second condition includes at least one of the following:

- the subscription information related to the first privacy protection operation allows the first privacy protection operation to be performed on the information and/or the data related to the terminal;
- the subscription information related to the first privacy protection operation has an object allowing the first privacy protection operation;
- the terminal does not have a capability of performing privacy protection on information and/or data;
- no privacy protection is performed on the information and/or the data related to the terminal;
- the first request information is obtained; and
- the subscription information related to the first privacy protection operation allows the first privacy protection operation to be performed on information and/or data of all or some first objects.

Optionally, the second request information includes at least one of the following:

- second indication information;
- description information of the second object; and
- a direction in which the first privacy protection operation is requested, where the second indication information is used to request to perform the first privacy protection operation on information and/or data related to a second object;
- the second object includes at least one of the following: a terminal, a second service, second information, second data, a second data channel, and a second computing task;
- the description information of the second object includes at least one of the following: description information of the terminal, description information of the second service, description information of the second information, description information of the second data, description information of the second data channel, and description information of the second computing task; and
- the second object includes one of the following: a first object; an object that is in the first object and on which the subscription information related to the first privacy protection operation allows the first privacy protection operation to be performed; and an object on which the subscription information related to the first privacy protection operation allows the first privacy protection operation to be performed.

In an implementation, the second object is a subset of the first object.

In an implementation, the second object includes an object that is in the first object and for which the subscription information related to the first privacy protection operation allows to perform the first privacy protection operation.

In another implementation, the second object includes an object for which the subscription information related to the first privacy protection operation allows to perform the first privacy protection operation.

The direction in which the first privacy protection operation is requested is used to request to perform the first privacy protection operation on information and/or data conforming to the direction in which the first privacy protection operation is requested.

Optionally, the direction in which the first privacy protection operation is requested includes at least one of the following:

a direction in which privacy protection is requested, to request to perform a privacy protection operation on information and/or data conforming to the direction in which privacy protection is requested; and a direction in which privacy protection removal is requested, to request to perform a privacy protection removal operation on information and/or data conforming to the direction in which privacy protection removal is requested.

In an implementation, the direction in which privacy protection is requested includes at least one of the following: an uplink and a downlink.

In an implementation, the direction in which privacy protection removal is requested includes at least one of the following: an uplink and a downlink.

In an implementation, a privacy protection direction includes at least one of the following: an uplink and a downlink.

In an implementation, a privacy protection removal direction includes at least one of the following: an uplink and a downlink.

Optionally, the privacy protection direction includes at least one of the following:

an encryption direction used to instruct to perform an encryption operation on information and/or data conforming to the encryption direction;

a scrambling direction used to instruct to perform a scrambling operation on information and/or data conforming to the scrambling direction; and an integrity protection direction used to instruct to perform an integrity protection operation on information and/or data conforming to the integrity protection direction.

Optionally, the privacy protection removal direction includes at least one of the following:

a decryption direction used to instruct to perform an encryption operation on information and/or data conforming to the encryption direction;

a descrambling direction used to instruct to perform a scrambling operation on information and/or data conforming to the scrambling direction; and an integrity protection removal direction used to instruct to perform an integrity protection operation on information and/or data conforming to the integrity protection direction.

Optionally, the information privacy protection method further includes:

receiving policy information of the first privacy protection operation; and performing a first operation according to the policy information of the first privacy protection operation, where the first operation includes at least one of the following:

generating policy information used for the first privacy protection operation on a fourth communications device;

sending, to the fourth communications device, the policy information used for the first privacy protection operation on the fourth communications device; and sending first response information and/or first privacy protection start information to a second target end that performs an operation of sending information and/or data of a second object.

Optionally, the second communications device receives the policy information of the first privacy protection operation sent by the third communications device.

In an implementation, the second communications device receives the policy information of the first privacy protection operation, and generates, according to the policy information of the first privacy protection operation, the policy information used for the first privacy protection operation on the fourth communications device.

In an implementation, the second communications device receives the policy information of the first privacy protection operation, generates, according to the policy information of the first privacy protection operation, the policy information used for the first privacy protection operation on the fourth communications device, and sends the policy information used for the first privacy protection operation on the fourth communications device to the fourth communications device.

The fourth communications device may be a UPF network element or a RAN, and the fourth communications device performs, according to the policy information of the first privacy protection operation, the first privacy protection operation on the information and/or the data related to the terminal.

In an implementation, the second communications device receives the policy information of the first privacy protection operation, and sends, according to the policy information of the first privacy protection operation, the first response information and/or the first privacy protection start information to the second target end (for example, the terminal) that performs the operation of sending the information and/or the data of the second object.

In this embodiment of this application, a second communications device receives policy information of a first privacy protection operation, sends the policy information to a fourth communications device that performs a first privacy protection operation, and sends response information and/or privacy protection start information to a target end that performs an operation of sending information and/or data of a second object, so that privacy protection can be performed by a communications network.

Optionally, the first response information includes at least one of the following: a success response to the first request information, and description information of a target object protected by first privacy protection;

and/or the first privacy protection start information includes at least one of the following: indication information used to indicate that first privacy protection starts, and the description information of the target object protected by first privacy protection, where the target object includes at least one of the following: a terminal, a target service, target information, target data, a target data channel, and a target computing task;

the description information of the target object includes at least one of the following: description information of the terminal, description information of the target service, description information of the target information, description information of the target data, description information of the target data channel, and description information of the target computing task; and the target object is the same as or different from the second object.

In an implementation, the first privacy protection operation includes at least one of the following:

a privacy protection operation; and a privacy protection removal operation, where the privacy protection operation includes at least one of the following:

encrypting information and/or data;

performing integrity protection on information and/or data;

scrambling information and/or data; and processing information and/or data by using a privacy protection algorithm;

the privacy protection removal operation includes at least one of the following:

decrypting information and/or data;

performing integrity protection removal on information and/or data;

descrambling information and/or data; and performing privacy protection removal on information and/or data on which privacy protection has been performed.

Optionally, the first request information includes at least one of the following:

first indication information, where the first indication information is used to request to perform the first privacy protection operation on information and/or data of a first object;

description information of the first object; and a direction in which the first privacy protection operation is requested, where the direction in which the first privacy protection operation is requested is used to request to perform the first privacy protection operation on information and/or data conforming to the direction in which the first privacy protection operation is requested, where the first object includes at least one of the following: a terminal, a first service, first information, first data, a first data channel, and a first computing task; and description information of the terminal, description information of the first service, description information of the first information, description information of the first data, description information of the first data channel, and description information of the first computing task.

Optionally, the information privacy protection method further includes:

sending third request information, where the third request information is used to request the subscription information related to the first privacy protection operation.

Optionally, the second communications device sends the third request information to a fifth communications device, where the third request information is used to request the subscription information related to the first privacy protection operation.

The fifth communications device may be a UDM network element.

Figure 4:
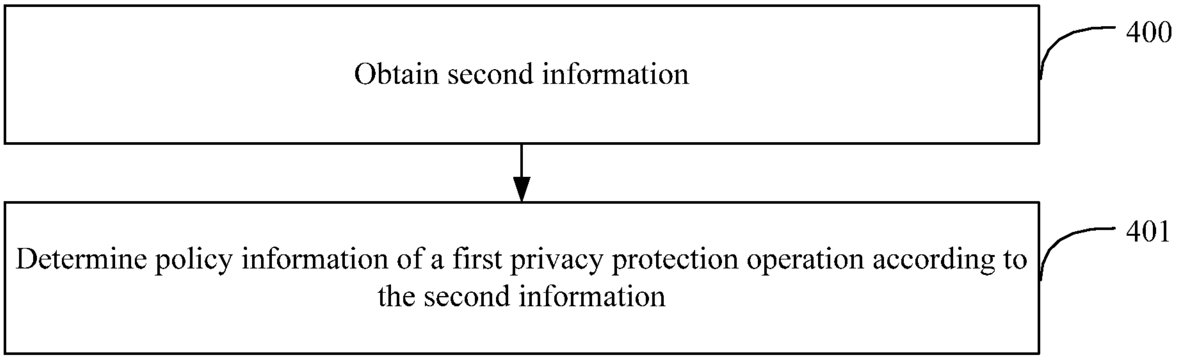
FIG. 4 is a third schematic flowchart of an information privacy protection method according to an embodiment of this application.

FIG. 4 is a third schematic flowchart of an information privacy protection method according to an embodiment of this application. The method is applied to a third communications device, and the third communications device may include but is not limited to a CN network element (for example, a PCF). As shown in FIG. 4, the method includes the following steps:

Step 400: Obtain second information.

Optionally, the third communications device obtains the second information.

The second information includes one of the following:

first information;

second request information; and subscription information related to a first privacy protection operation, where the first information includes at least one of the following:

first request information, where the first request information is used to request to perform the first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal; and the second request information is used to request the policy information of the first privacy protection operation.

Step 401: Determine policy information of a first privacy protection operation according to the second information.

Optionally, the third communications device determines the policy information of the first privacy protection operation according to the second information.

In this embodiment of this application, a third communications device determines policy information of a first privacy protection operation according to second information, so that privacy protection can be performed by a communications network.

Optionally, the first privacy protection operation includes at least one of the following:

a privacy protection operation; and a privacy protection removal operation.

Optionally, the privacy protection operation includes at least one of the following:

encrypting information and/or data;

performing integrity protection on information and/or data;

scrambling information and/or data; and processing information and/or data by using a privacy protection algorithm;

and/or the privacy protection removal operation includes at least one of the following:

decrypting information and/or data;

performing integrity protection removal on information and/or data;

descrambling information and/or data; and performing privacy protection removal on information and/or data on which privacy protection has been performed.

Optionally, the privacy protection algorithm includes at least one of the following: homomorphic encryption, differential computing, a garbled circuit, and secret sharing.

Optionally, the first request information includes at least one of the following:

first indication information, where the first indication information is used to request to perform the first privacy protection operation on information and/or data of a first object;

description information of the first object; and a direction in which the first privacy protection operation is requested, where the direction in which the first privacy protection operation is requested is used to request to perform the first privacy protection operation on information and/or data conforming to the direction in which the first privacy protection operation is requested, where the first object includes at least one of the following: a terminal, a first service, first information, first data, a first data channel, and a first computing task; and the description information of the first object includes at least one of the following: description information of the terminal, description information of the first service, description information of the first information, description information of the first data, description information of the first data channel, and description information of the first computing task.

Optionally, the subscription information related to the first privacy protection operation includes at least one of the following:

allowing and/or requiring first privacy protection;

not allowing and/or not requiring first privacy protection;

description information of an object allowing and/or requiring first privacy protection; and description information of an object not allowing and/or not requiring first privacy protection.

In an implementation, the subscription information of the first privacy protection operation is subscription information of a terminal, a service provider, and/or a third party to the first privacy protection operation.

In some optional embodiments, the determining policy information of a first privacy protection operation includes:

determining the policy information of the first privacy protection operation in a case that a third condition is met.

The third communications device determines, according to the second information, whether the third condition is met, and determines the policy information of the first privacy protection operation in a case that the third condition is met.

The third condition includes at least one of the following:

the subscription information related to the first privacy protection operation allows the first privacy protection operation to be performed on the information and/or the data related to the terminal;

the subscription information related to the first privacy protection operation has an object allowing the first privacy protection operation;

the terminal does not have a capability of performing privacy protection on information and/or data;

no privacy protection is performed on the information and/or the data related to the terminal;

the first request information is obtained;

the subscription information related to the first privacy protection operation allows the first privacy protection operation to be performed on information and/or data of all or some first objects;

second request information is obtained; and the subscription information related to the first privacy protection operation allows the first privacy protection operation to be performed on information and/or data of all or some second objects.

Optionally, the information privacy protection method further includes:

performing a second operation.

Optionally, after determining the policy information of the first privacy protection operation, the third communications device performs the second operation.

The second operation includes at least one of the following:

generating the policy information of the first privacy protection operation;

sending the policy information of the first privacy protection operation to a fourth communications device; and sending the policy information of the first privacy protection operation to a second communications device.

Optionally, the third communications device generates the policy information of the first privacy protection operation, and sends the policy information of the first privacy protection operation to the fourth communications device.

The fourth communications device may be a UPF network element or a RAN, and the fourth communications device performs, according to the policy information of the first privacy protection operation, the first privacy protection operation on the information and/or the data related to the terminal.

Optionally, the third communications device generates the policy information of the first privacy protection operation, and sends the policy information of the first privacy protection operation to the second communications device, so that the second communications device performs the first operation according to the policy information of the first privacy protection operation.

The first operation includes at least one of the following:

generating policy information used for the first privacy protection operation on a fourth communications device;

sending, to the fourth communications device, the policy information used for the first privacy protection operation on the fourth communications device; and sending first response information and/or first privacy protection start information to a second target end that performs an operation of sending information and/or data of a second object.

Optionally, the policy information of the first privacy protection operation includes at least one of the following:

description information of a target object;

a privacy protection direction used to perform a privacy protection operation on information and/or data conforming to the privacy protection direction;

a privacy protection removal direction used to perform a privacy protection removal operation on information and/or data conforming to the privacy protection removal direction; and an algorithm for the first privacy protection operation, where the target object includes at least one of the following: a terminal, a target service, target information, target data, a target data channel, and a target computing task; and the description information of the target object includes at least one of the following: description information of the terminal, description information of the target service, description information of the target information, description information of the target data, description information of the target data channel, and description information of the target computing task;

the target object is the same as or different from the second object; and the target object is the same as or different from the first object.

In an implementation, a privacy protection direction includes at least one of the following: an uplink and a downlink.

In an implementation, a privacy protection removal direction includes at least one of the following: an uplink and a downlink.

Optionally, the privacy protection direction includes at least one of the following:

an encryption direction used to instruct to perform an encryption operation on information and/or data conforming to the encryption direction;

a scrambling direction used to instruct to perform a scrambling operation on information and/or data conforming to the scrambling direction; and an integrity protection direction used to instruct to perform an integrity protection operation on information and/or data conforming to the integrity protection direction.

Optionally, the privacy protection removal direction includes at least one of the following:

a decryption direction used to instruct to perform an encryption operation on information and/or data conforming to the encryption direction;

a descrambling direction used to instruct to perform a scrambling operation on information and/or data conforming to the scrambling direction; and an integrity protection removal direction used to instruct to perform an integrity protection operation on information and/or data conforming to the integrity protection direction.

Further, the algorithm for the first privacy protection operation includes at least one of the following:

an encryption algorithm for the first privacy protection operation;

a scrambling algorithm for the first privacy protection operation;

an integrity protection algorithm for the first privacy protection operation;

a decryption algorithm for the first privacy protection operation;

a descrambling algorithm for the first privacy protection operation;

an integrity protection removal algorithm for the first privacy protection operation;

homomorphic encryption;

differential privacy;

a garbled circuit; and secret sharing.

Optionally, the method further includes:

sending third request information, where the third request information is used to request the subscription information related to the first privacy protection operation.

Optionally, the third communications device sends the third request information to a fifth communications device, where the third request information is used to request the subscription information related to the first privacy protection operation.

The fifth communications device may be a UDM network element.

Figure 5:
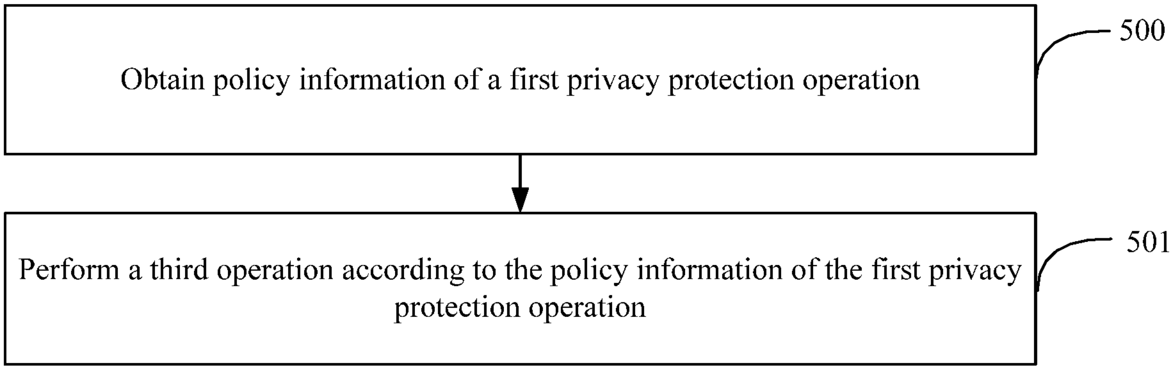
FIG. 5 is a fourth schematic flowchart of an information privacy protection method according to an embodiment of this application.

FIG. 5 is a fourth schematic flowchart of an information privacy protection method according to an embodiment of this application. The method is applied to a fourth communications device, and the fourth communications device includes but is not limited to a CN network element, for example, a gateway (such as a PDU session anchor (PSA) or a UPF), and a RAN network element. As shown in FIG. 5, the method includes the following steps:

Step 500: Obtain policy information of a first privacy protection operation.

Optionally, the fourth communications device obtains the policy information of the first privacy protection operation.

Step 501: Perform a third operation according to the policy information of the first privacy protection operation.

The fourth communications device performs the third operation according to the received policy information of the first privacy protection operation.

The third operation includes at least one of the following:

installing the policy information of the first privacy protection operation; and performing the first privacy protection operation on information and/or data related to a terminal.

In this embodiment of this application, a fourth communications device performs a first privacy protection operation according to policy information of the first privacy protection operation, so that privacy protection can be performed by a communications network.

Optionally, the policy information of the first privacy protection operation includes at least one of the following:

description information of a target object;

a privacy protection direction used to perform a privacy protection operation on information and/or data conforming to the privacy protection direction;

a privacy protection removal direction used to perform a privacy protection removal operation on information and/or data conforming to the privacy protection removal direction; and an algorithm for the first privacy protection operation, where the target object includes at least one of the following: a terminal, a target service, target information, target data, a target data channel, and a target computing task; and the description information of the target object includes at least one of the following: description information of the terminal, description information of the target service, description information of the target information, description information of the target data, description information of the target data channel, and description information of the target computing task;

the target object is the same as or different from the second object; and the target object is the same as or different from the first object.

In an implementation, an uplink is a default privacy protection direction, and a downlink is a default privacy protection removal direction. It is not difficult to understand that, generally, the terminal requests to perform privacy protection on information or data sent to a server.

In an implementation, a privacy protection direction includes at least one of the following: an uplink and a downlink.

In an implementation, a privacy protection removal direction includes at least one of the following: an uplink and a downlink.

Optionally, the privacy protection direction includes at least one of the following:

an encryption direction used to instruct to perform an encryption operation on information and/or data conforming to the encryption direction;

a scrambling direction used to instruct to perform a scrambling operation on information and/or data conforming to the scrambling direction; and an integrity protection direction used to instruct to perform an integrity protection operation on information and/or data conforming to the integrity protection direction.

Optionally, the privacy protection removal direction includes at least one of the following:

a decryption direction used to instruct to perform an encryption operation on information and/or data conforming to the encryption direction;

a descrambling direction used to instruct to perform a scrambling operation on information and/or data conforming to the scrambling direction; and an integrity protection removal direction used to instruct to perform an integrity protection operation on information and/or data conforming to the integrity protection direction.

Further, the algorithm for the first privacy protection operation includes at least one of the following:

an encryption algorithm for the first privacy protection operation;

a scrambling algorithm for the first privacy protection operation;

an integrity protection algorithm for the first privacy protection operation;

a decryption algorithm for the first privacy protection operation;

a descrambling algorithm for the first privacy protection operation;

an integrity protection removal algorithm for the first privacy protection operation;

homomorphic encryption;

differential privacy;

a garbled circuit; and secret sharing.

Optionally, the performing the first privacy protection operation on information and/or data related to a terminal includes at least one of the following:

performing a privacy protection operation on information and/or data of a target object according to an algorithm for the first privacy protection operation;

performing a privacy protection removal operation on the information and/or the data of the target object according to the algorithm for the first privacy protection operation;

performing a privacy protection operation on information and/or data, conforming to a privacy protection direction, of the target object according to the algorithm for the first privacy protection operation;

performing a privacy protection removal operation on information and/or data, conforming to a privacy protection removal direction, of the target object according to the algorithm for the first privacy protection operation;

performing a privacy protection operation on information and/or data in an uplink direction of the target object according to the algorithm for the first privacy protection operation; and performing a privacy protection removal operation on information and/or data in a downlink direction of the target object according to the algorithm for the first privacy protection operation.

In an implementation, the performing a privacy protection operation on information and/or data, conforming to a privacy protection direction, of the target object according to the algorithm for the first privacy protection operation includes at least one of the following:

performing an encryption operation on information and/or data, conforming to an encryption direction, of the target object according to the encryption algorithm for the first privacy protection operation;

performing a scrambling operation on information and/or data, conforming to a scrambling direction, of the target object according to the scrambling algorithm for the first privacy protection operation;

performing an integrity protection operation on information and/or data, conforming to an integrity protection direction, of the target object according to the integrity protection algorithm for the first privacy protection operation;

performing an encryption operation on uplink information and/or data of the target object;

performing a scrambling operation on uplink information and/or data of the target object; and performing an integrity protection operation on uplink information and/or data of the target object.

In an implementation, the performing a privacy protection removal operation on information and/or data, conforming to a privacy protection removal direction, of the target object according to the algorithm for the first privacy protection operation includes at least one of the following:

performing a decryption operation on information and/or data, conforming to a decryption direction, of the target object according to the decryption algorithm for the first privacy protection operation;

performing a descrambling operation on information and/or data, conforming to a descrambling direction, of the target object according to the descrambling algorithm for the first privacy protection operation;

performing an integrity protection removal operation on information and/or data, conforming to an integrity protection removal direction, of the target object according to the integrity protection removal algorithm for the first privacy protection operation;

performing a decryption operation on downlink information and/or data of the target object;

performing a descrambling operation on downlink information and/or data of the target object; and performing an integrity protection removal operation on downlink information and/or data of the target object.

In this embodiment of this application, the fourth communications device supports various first privacy protection operations, so that privacy protection can be performed by a communications network.

Optionally, the information privacy protection method further includes at least one of the following:

sending, to a first target end, information and/or data on which privacy protection has been performed;

sending, to a second target end, information and/or data on which privacy protection removal has been performed;

sending information and/or data, on which privacy protection has been performed, of a target object to a privacy protection direction; and sending information and/or data on which privacy protection removal has been performed to a privacy protection removal direction.

Optionally, after performing the first privacy protection operation according to the policy information of the first privacy protection operation, the fourth communications device sends information and/or data on which the first privacy protection operation has been performed.

In an implementation, the first target end may include one of the following: a server, and a network element that collects terminal information (for example, a network data analytic function (NWDAF)), and the second target end may include a terminal. The first target end may be located in a communications network or outside a communications network (for example, outside an N6 interface).

For example, when the terminal requests a cloud server to execute a computing task (for example, rendering breakthrough), but does not want the server to perceive to-be-computed content, the communications network serves as an intermediate link between the terminal and the server, and may perform privacy protection for information and/or data to be sent by the terminal to the server.

For another example, the network element that collects terminal information may collect information about the terminal. However, when the terminal requests privacy protection, a network element between the terminal and the network element that collects terminal information may also perform privacy protection for information and/or data of the terminal.

In another implementation, the first target end may include a terminal, and the second target end may include a server. The second target end may be located in a communications network or outside a communications network (for example, outside an N6 interface).

For example, the server expects the terminal to undertake some computing tasks but does not want the terminal to perceive to-be-computed content. As an intermediate link between the terminal and the server, the communications network may perform privacy protection on information and/or data to be sent by the server to the terminal.

In another implementation, the first target end may include a first terminal, and the second target end may include a second terminal. For example, the two terminals are connected to a communications network. When the second terminal wants to offload a computing task to the first terminal, the communications network may be responsible for privacy protection of information and/or data transmitted between the two terminals.

Figure 6:
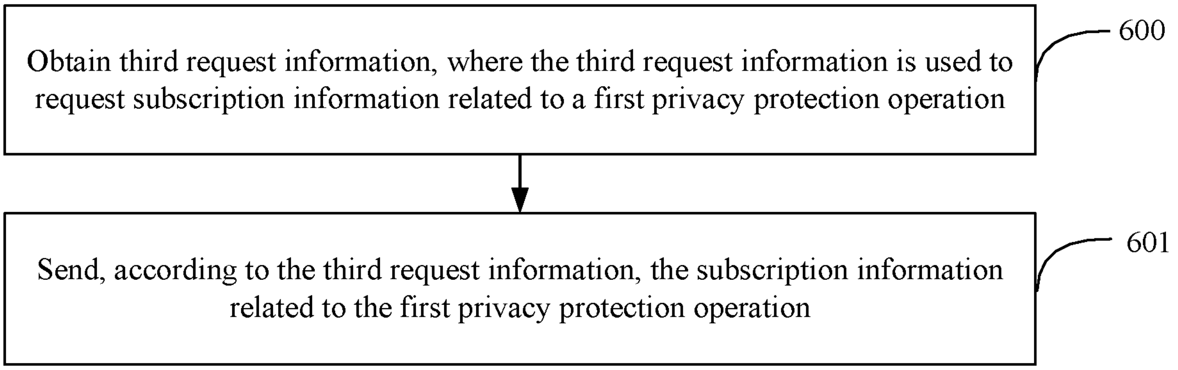
FIG. 6 is a fifth schematic flowchart of an information privacy protection method according to an embodiment of this application.

FIG. 6 is a fifth schematic flowchart of an information privacy protection method according to an embodiment of this application. The method is applied to a fifth communications device, and the fifth communications device may be a UDM network element. As shown in FIG. 6, the method includes the following steps:

Step 600: Obtain third request information, where the third request information is used to request subscription information related to a first privacy protection operation.

Optionally, the fifth communications device obtains the third request information sent by a second communications device or a third communications device, where the third request information is used to request the subscription information related to the first privacy protection operation.

Step 601: Send, according to the third request information, the subscription information related to the first privacy protection operation.

The fifth communications device sends the subscription information related to the first privacy protection operation to the second communications device or the third communications device according to the third request information.

In this embodiment of this application, a fifth communications device sends subscription information related to a first privacy protection operation to a second communications device or a third communications device, so that privacy protection can be performed by a communications network.

Optionally, the subscription information related to the first privacy protection operation includes at least one of the following:

- allowing and/or requiring first privacy protection;
- not allowing and/or not requiring first privacy protection;
- description information of an object allowing and/or requiring first privacy protection; and
- description information of an object not allowing and/or not requiring first privacy protection.

In an implementation, the subscription information of the first privacy protection operation is subscription information of a terminal, a service provider, and/or a third party to the first privacy protection operation.

Figure 7:
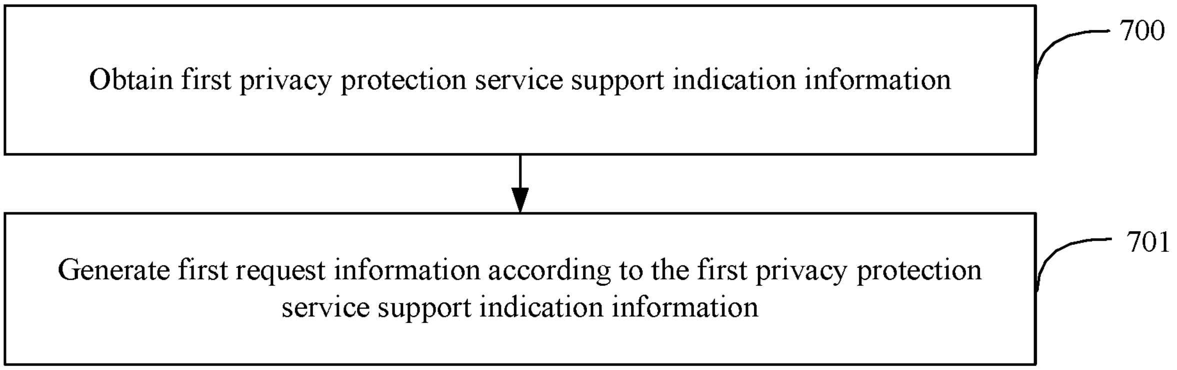
FIG. 7 is a sixth schematic flowchart of an information privacy protection method according to an embodiment of this application.

FIG. 7 is a sixth schematic flowchart of an information privacy protection method according to an embodiment of this application. The method is applied to a sixth communications device, and the sixth communications device may be UE. As shown in FIG. 7, the method includes the following steps:

Step 700: Obtain first privacy protection service support indication information.

Optionally, the sixth communications device obtains the first privacy protection service support indication information sent by an access and mobility management function (AMF) network element.

Step 701: Generate first request information according to the first privacy protection service support indication information.

Optionally, after obtaining the first privacy protection service support indication information, the sixth communications device generates the first request information according to the first privacy protection service support indication information.

The first request information is used to request to perform a first privacy protection operation on information and/or data related to a terminal.

Optionally, the first request information includes at least one of the following:

- first indication information, where the first indication information is used to request to perform the first privacy protection operation on information and/or data of a first object;
- description information of the first object; and
- a direction in which the first privacy protection operation is requested, where the direction in which the first privacy protection operation is requested is used to request to perform the first privacy protection operation on information and/or data conforming to the direction in which the first privacy protection operation is requested, where
- the first object includes at least one of the following: a terminal, a first service, first information, first data, a first data channel, and a first computing task; and
- the description information of the target object includes at least one of the following: description information of the terminal, description information of the first service, description information of the first information, description information of the first data, description information of the first data channel, and description information of the first computing task.

In this embodiment of this application, a sixth communications device generates first request information according to first privacy protection service support indication information, so that privacy protection can be performed by a communications network.

Optionally, before the step of obtaining first privacy protection service support indication information, the method further includes:

sending capability information of the terminal.

Optionally, the sixth communications device sends a registration request to the AMF network element, where the registration request carries the capability information of the terminal. The sixth communications device receives a registration response sent by the AMF network element, where the registration response carries the first privacy protection service support indication information.

The capability information of the terminal is used to indicate that the terminal has a capability of performing privacy protection on information and/or data, or that the terminal has no capability of performing privacy protection on information and/or data.

Figure 8:
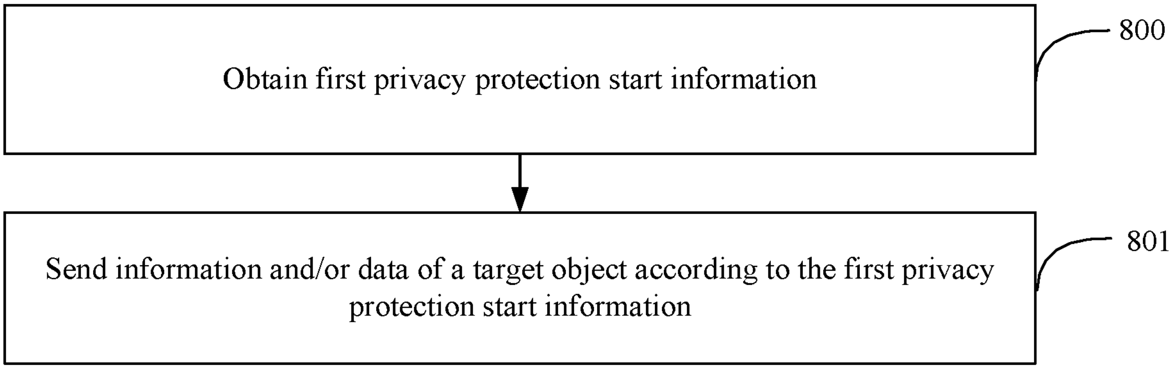
FIG. 8 is a seventh schematic flowchart of an information privacy protection method according to an embodiment of this application.

FIG. 8 is a seventh schematic flowchart of an information privacy protection method according to an embodiment of this application. The method is applied to a seventh communications device, and the seventh communications device may be UE. As shown in FIG. 8, the method includes the following steps:

Step 800: Obtain first privacy protection start information.

Optionally, the seventh communications device receives the first privacy protection start information sent by a second communications device.

The first privacy protection start information includes at least one of the following: indication information used to indicate that first privacy protection starts, and the description information of the target object protected by first privacy protection, where

- the target object includes at least one of the following: a terminal, a target service, target information, target data, a target data channel, and a target computing task; and
- the description information of the target object includes at least one of the following: description information of the terminal, description information of the target service, description information of the target information, description information of the target data, description information of the target data channel, and description information of the target computing task.

Step 801: Send information and/or data according to the first privacy protection start information.

Optionally, the sending information and/or data according to the first privacy protection start information includes:

- sending information and/or data of the target object according to the first privacy protection start information.

In an implementation, the first privacy protection start information is received from a network that performs privacy protection; and the information and/or the data (for example, the information and/or the data of the target object) to the network that performs privacy protection.

For understanding of the target object, refer to the foregoing embodiment. Details are not described herein again.

In this embodiment of this application, a seventh communications device sends information and/or data to a network according to first privacy protection start information, and then the network performs a first privacy protection. In this way, not only privacy protection is supported, but also air interface transmission resources are saved.

Figure 9:
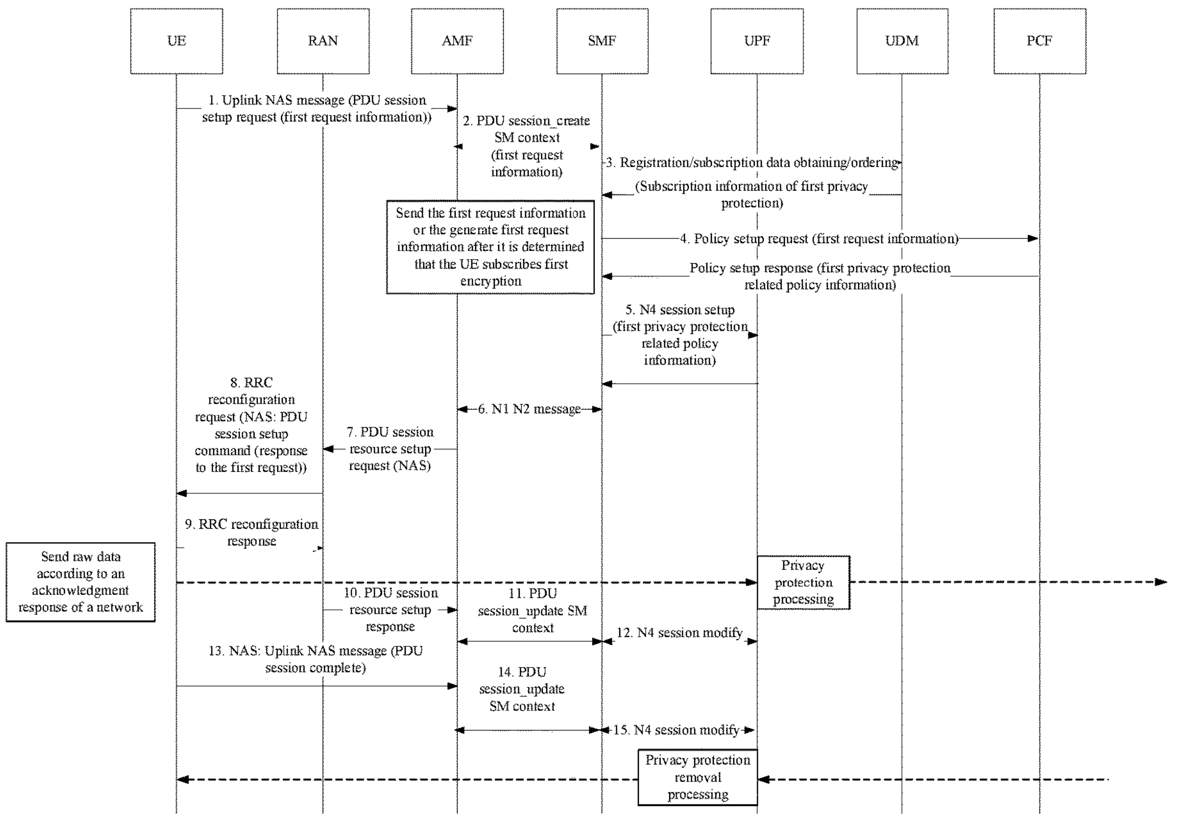
FIG. 9 is an eight schematic flowchart of an information privacy protection method according to an embodiment of this application.

FIG. 9 is an eight schematic flowchart of an information privacy protection method according to an embodiment of this application. As shown in FIG. 9, the method includes the following steps:

Step 1 to Step 2: Send first information, where the first information includes at least one of the following:

- first request information, where the first request information is used to request to perform a first privacy protection operation on information and/or data related to a terminal;
- capability information of the terminal; and
- privacy protection indication information.

Step 3: An SMF obtains at least one of the following: first information and/or subscription information related to the first privacy protection operation.

The SMF determines, according to the obtained information, whether to send second request information. The second request information is used to request policy information of the first privacy protection operation.

When second condition is met, it is determined to send the second request information.

The second condition includes at least one of the following:

- the subscription information related to the first privacy protection operation allows the first privacy protection operation to be performed on the information and/or the data related to the terminal;
- the subscription information related to the first privacy protection operation has an object allowing the first privacy protection operation;
- the terminal does not have a capability of performing privacy protection on information and/or data;
- no privacy protection is performed on the information and/or the data related to the terminal;
- the first request information is obtained; and
- the subscription information related to the first privacy protection operation allows the first privacy protection operation to be performed on information and/or data of all or some first objects.

When it is determined to send the second request information, step 4 is performed.

Step 4: The SMF sends the second request information to a PCF.

The PCF returns first privacy protection-related policy information to the SMF.

The SMF generates, according to the first privacy protection-related policy information, first privacy protection-related policy information used on a UPF.

Step 5: The SMF sends the first privacy protection-related policy information to the UPF to establish an N4 session.

The UPF returns acknowledgement information to the SMF.

Step 6 to Step 8: The SMF sends first response information and/or first privacy protection start information to UE by using an AMF, a RAN, and the like.

The first response information may be used to indicate at least one of the following: successfully responding to the first request information; and failing to respond to the first request information; and

- the first privacy protection start information includes indication information used to indicate that first privacy protection starts, and description information of a target object protected by first privacy protection.

Step 9 to step 15: The UE sends data of the first object according to the obtained information. After receiving the data that is of the first object and that is sent by the UE, the UPF performs privacy protection before forwarding.

Figure 10:
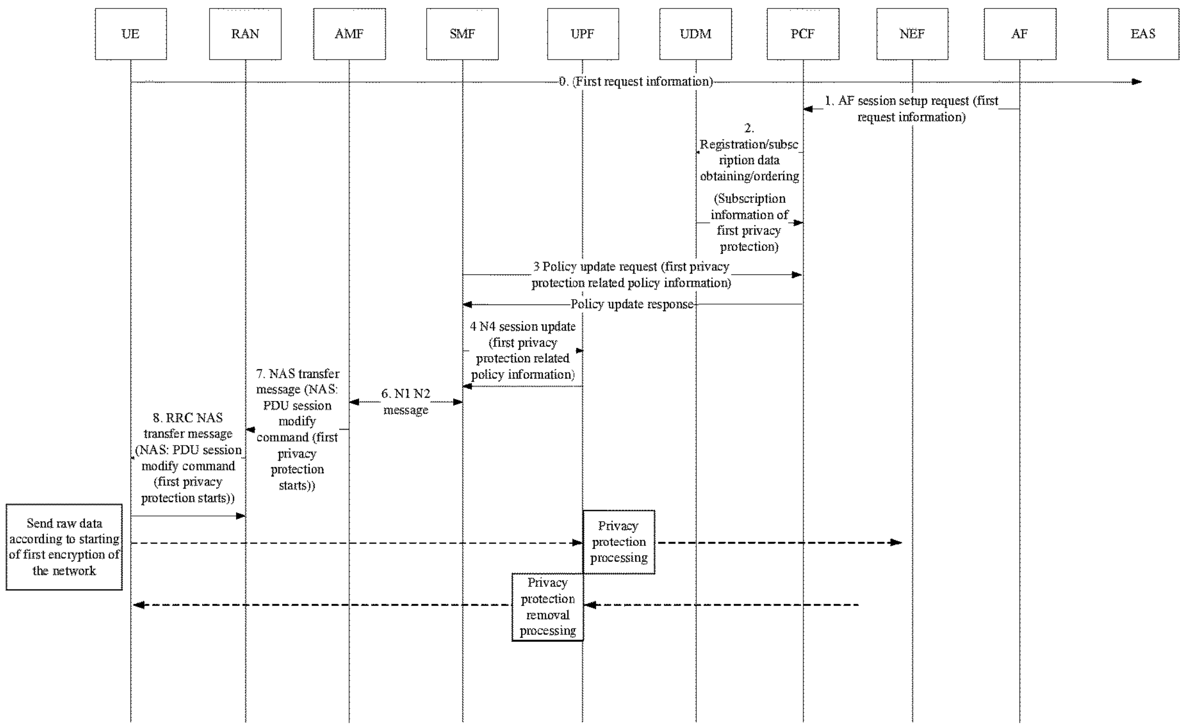
FIG. 10 is a ninth schematic flowchart of an information privacy protection method according to an embodiment of this application.

FIG. 10 is a ninth schematic flowchart of an information privacy protection method according to an embodiment of this application. As shown in FIG. 10, the method includes the following steps:

Step 1: An AF sends first information, where the first information includes at least one of the following:

first request information, where the first request information is used to request to perform a first privacy protection operation on information and/or data related to a terminal;

capability information of the terminal; and privacy protection indication information.

Step 2: A PCF obtains at least one of the following: first information and/or subscription information related to the first privacy protection operation.

The PCF determines, according to the obtained information, whether to generate policy information of the first privacy protection operation.

The policy information of the first privacy protection operation is determined when a third condition is met.

The third condition includes at least one of the following:

the subscription information related to the first privacy protection operation allows the first privacy protection operation to be performed on the information and/or the data related to the terminal;

the subscription information related to the first privacy protection operation has an object allowing the first privacy protection operation;

the terminal does not have a capability of performing privacy protection on information and/or data;

no privacy protection is performed on the information and/or the data related to the terminal;

the first request information is obtained;

the subscription information related to the first privacy protection operation allows the first privacy protection operation to be performed on information and/or data of all or some first objects;

second request information is obtained; and the subscription information related to the first privacy protection operation allows the first privacy protection operation to be performed on information and/or data of all or some second objects.

When it is determined to generate the policy information of the first privacy protection operation, step 3 is performed.

Step 3: The PCF returns the policy information of the first privacy protection operation to an SMF.

The SMF generates, according to the policy information of the first privacy protection operation, policy information that is of the first privacy protection operation and that is used on a UPF.

Step 4: The SMF returns the policy information of the first privacy protection operation to the UPF.

The UPF returns acknowledgement information to the SMF.

Step 6 to Step 8: The SMF sends first response information and/or first privacy protection start information to UE by using an AMF, a RAN, and the like, where the first response may be used to indicate at least one of the following: successfully responding to the first request information; and failing to respond to the first request information; and the first privacy protection start information includes indication information used to indicate that first privacy protection starts, and description information of a target object protected by first privacy protection.

The UE sends data of the first object according to the obtained information. After receiving the data that is of the first object and that is sent by the UE, the UPF performs privacy protection before forwarding.

It should be noted that, the information privacy protection method provided in the embodiments of this application may be performed by an information privacy protection apparatus, or a control module that is in the information privacy protection apparatus and that is configured to perform the information privacy protection method. In the embodiments of this application, that the information privacy protection apparatus performs the information privacy protection method is used as an example to describe the information privacy protection apparatus provided in the embodiments of this application.

Figure 11:
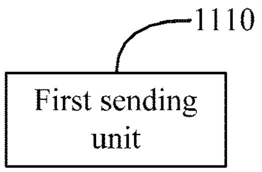
FIG. 11 is a first schematic structural diagram of an information privacy protection apparatus according to an embodiment of this application.

FIG. 11 is a first schematic structural diagram of an information privacy protection apparatus according to an embodiment of this application. The apparatus is applied to a first communications device, and the apparatus includes:

a first sending unit 1110, configured to send first information, where the first information includes at least one of the following:

first request information, where the first request information is used to request to perform a first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal.

Optionally, the first request information includes at least one of the following:

first indication information, where the first indication information is used to request to perform the first privacy protection operation on information and/or data of a first object;

description information of the first object; and a direction in which the first privacy protection operation is requested, where the direction in which the first privacy protection operation is requested is used to request to perform the first privacy protection operation on information and/or data conforming to the direction in which the first privacy protection operation is requested, where the first object includes at least one of the following: a terminal, a first service, first information, first data, a first data channel, and a first computing task; and the description information of the first object includes at least one of the following: description information of the terminal, description information of the first service, description information of the first information, description information of the first data, description information of the first data channel, and description information of the first computing task.

Optionally, the first privacy protection operation includes at least one of the following:

a privacy protection operation; and a privacy protection removal operation.

Optionally, the direction in which the first privacy protection operation is requested includes at least one of the following:

a direction in which privacy protection is requested, to request to perform a privacy protection operation on information and/or data conforming to the direction in which privacy protection is requested; and a direction in which privacy protection removal is requested, to request to perform a privacy protection removal operation on information and/or data conforming to the direction in which privacy protection removal is requested.

Optionally, the privacy protection operation includes at least one of the following:

encrypting information and/or data;

performing integrity protection on information and/or data;

scrambling information and/or data; and processing information and/or data by using a privacy protection algorithm;

and/or the privacy protection removal operation includes at least one of the following:

decrypting information and/or data;

performing integrity protection removal on information and/or data;

descrambling information and/or data; and performing privacy protection removal on information and/or data on which privacy protection has been performed.

Optionally, the sending first information includes:

sending the first request information in a case that a first condition is met, where the first condition includes at least one of the following:

information and/or data of a first object need/needs to be disclosed to a first target end;

the information and/or the data of the first object need/needs to be sent to the first target end for computing;

a network supports performing the first privacy protection operation on the information and/or the data related to the terminal; and the terminal allows the network to perform the first privacy protection operation on the information and/or the data related to the terminal.

Optionally, the apparatus further includes:

a first obtaining unit, configured to obtain first response information and/or first privacy protection start information; and a first execution unit, configured to perform one of the following according to the first response information and/or the first privacy protection start information:

sending information and/or data of a first object; and sending information and/or data of a target object, where the first response information includes at least one of the following: a success response to the first request information, and description information of the target object protected by first privacy protection;

the first privacy protection start information includes at least one of the following: indication information used to indicate that first privacy protection starts, and the description information of the target object protected by first privacy protection;

the target object includes at least one of the following: a terminal, a target service, target information, target data, a target data channel, and a target computing task;

the description information of the target object includes at least one of the following: description information of the terminal, description information of the target service, description information of the target information, description information of the target data, description information of the target data channel, and description information of the target computing task; and the target object is the same as or different from the first object.

In this embodiment of this application, first information is sent, where the first information reflects at least one of an object on which first privacy protection is to be performed, whether a terminal has a privacy protection capability, and whether privacy protection has been performed on information and/or data related to the terminal, so that privacy protection can be performed by a communications network.

The information privacy protection apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (Network Attached Storage, NAS), a personal computer (PC), a television (TV), an automated teller machine, or a self-service machine. This is not specifically limited in the embodiments of this application.

The information privacy protection apparatus in this embodiment of this application may be an apparatus with an operating system. The operating system may be an Android operating system, an iOS operating system, or another possible operating system. This is not specifically limited in this embodiment of this application.

The information privacy protection apparatus provided in this embodiment of this application can implement the processes implemented in the method embodiment in FIG. 2, FIG. 9, and FIG. 10, and achieve a same technical effect. To avoid repetition, details are not described herein again.

Figure 12:
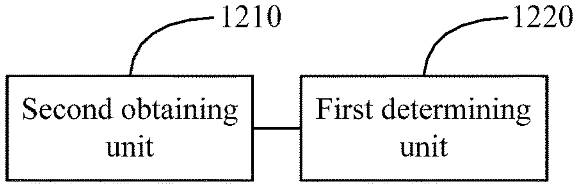
FIG. 12 is a second schematic structural diagram of an information privacy protection apparatus according to an embodiment of this application.

FIG. 12 is a second schematic structural diagram of an information privacy protection apparatus according to an embodiment of this application. The apparatus is applied to a second communications device, and the apparatus includes:

a second obtaining unit 1210, configured to obtain first information and/or subscription information related to a first privacy protection operation; and a first determining unit 1220, configured to determine, according to the first information and/or the subscription information related to the first privacy protection operation, to send second request information or not to send second request information, where the second request information is used to request policy information of the first privacy protection operation; and the first information includes at least one of the following:

first request information, where the first request information is used to request to perform the first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal.

Optionally, the subscription information related to the first privacy protection operation includes at least one of the following:

allowing and/or requiring first privacy protection;

not allowing and/or not requiring first privacy protection;

description information of an object allowing and/or requiring first privacy protection; and description information of an object not allowing and/or not requiring first privacy protection.

Optionally, the determining to send second request information includes:

in a case that a second condition is met, determining to send the second request information, where the second condition includes at least one of the following:

the subscription information related to the first privacy protection operation allows the first privacy protection operation to be performed on the information and/or the data related to the terminal;

the subscription information related to the first privacy protection operation has an object allowing the first privacy protection operation;

the terminal does not have a capability of performing privacy protection on information and/or data;

no privacy protection is performed on the information and/or the data related to the terminal;

the first request information is obtained; and the subscription information related to the first privacy protection operation allows the first privacy protection operation to be performed on information and/or data of all or some first objects.

Optionally, the second request information includes at least one of the following:

second indication information, where the second indication information is used to request to perform the first privacy protection operation on information and/or data related to a second object;

description information of the second object; and a direction in which the first privacy protection operation is requested, where the direction in which the first privacy protection operation is requested is used to request to perform the first privacy protection operation on information and/or data conforming to the direction in which the first privacy protection operation is requested, where the second object includes at least one of the following: a terminal, a second service, second information, second data, a second data channel, and a second computing task;

the description information of the second object includes at least one of the following: description information of the terminal, description information of the second service, description information of the second information, description information of the second data, description information of the second data channel, and description information of the second computing task; and the second object includes one of the following: a first object; an object that is in the first object and on which the subscription information related to the first privacy protection operation allows the first privacy protection operation to be performed; and an object on which the subscription information related to the first privacy protection operation allows the first privacy protection operation to be performed.

Optionally, the direction in which the first privacy protection operation is requested includes at least one of the following:

a direction in which privacy protection is requested, to request to perform a privacy protection operation on information and/or data conforming to the direction in which privacy protection is requested; and a direction in which privacy protection removal is requested, to request to perform a privacy protection removal operation on information and/or data conforming to the direction in which privacy protection removal is requested.

Optionally, the apparatus further includes:

a first receiving unit, configured to receive policy information of the first privacy protection operation; and a second execution unit, configured to perform a first operation according to the policy information of the first privacy protection operation, where the first operation includes at least one of the following:

generating policy information used for the first privacy protection operation on a fourth communications device;

sending, to the fourth communications device, the policy information used for the first privacy protection operation on the fourth communications device; and sending first response information and/or first privacy protection start information to a second target end that performs an operation of sending information and/or data of a second object.

Optionally, the first response information includes at least one of the following: a success response to the first request information, and description information of a target object protected by first privacy protection;

and/or the first privacy protection start information includes at least one of the following: indication information used to indicate that first privacy protection starts, and the description information of the target object protected by first privacy protection, where the target object includes at least one of the following: a terminal, a target service, target information, target data, a target data channel, and a target computing task;

the description information of the target object includes at least one of the following: description information of the terminal, description information of the target service, description information of the target information, description information of the target data, description information of the target data channel, and description information of the target computing task; and the target object is the same as or different from the second object.

Optionally, the apparatus further includes:

a second sending unit, configured to send third request information, where the third request information is used to request the subscription information related to the first privacy protection operation.

In this embodiment of this application, it is determined, according to first information and/or subscription information related to a first privacy protection operation, whether to send policy information used to request the first privacy protection operation, so that privacy protection can be performed by a communications network.

The information privacy protection apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The information privacy protection apparatus in this embodiment of this application may be an apparatus with an operating system. The operating system may be an Android (Android) operating system, an iOS operating system, or another possible operating system. This is not specifically limited in this embodiment of this application.

The information privacy protection apparatus provided in this embodiment of this application can implement the processes implemented in the method embodiment in FIG. 3, and achieve a same technical effect. To avoid repetition, details are not described herein again.

Figure 13:
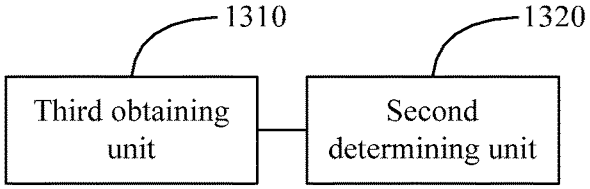
FIG. 13 is a third schematic structural diagram of an information privacy protection apparatus according to an embodiment of this application.

FIG. 13 is a third schematic structural diagram of an information privacy protection apparatus according to an embodiment of this application. The apparatus is applied to a third communications device, and the apparatus includes:

a third obtaining unit 1310, configured to obtain second information; and a second determining unit 1320, configured to determine policy information of a first privacy protection operation according to the second information, where the second information includes one of the following:

first information;

second request information; and subscription information related to the first privacy protection operation, where the first information includes at least one of the following:

first request information, where the first request information is used to request to perform the first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal; and the second request information is used to request the policy information of the first privacy protection operation.

Optionally, the second determining unit is configured to:

determine the policy information of the first privacy protection operation in a case that a third condition is met, where the third condition includes at least one of the following:

the subscription information related to the first privacy protection operation allows the first privacy protection operation to be performed on the information and/or the data related to the terminal;

the subscription information related to the first privacy protection operation has an object allowing the first privacy protection operation;

the terminal does not have a capability of performing privacy protection on information and/or data;

no privacy protection is performed on the information and/or the data related to the terminal;

the first request information is obtained;

the subscription information related to the first privacy protection operation allows the first privacy protection operation to be performed on information and/or data of all or some first objects;

the second request information is obtained; and the subscription information related to the first privacy protection operation allows the first privacy protection operation to be performed on information and/or data of all or some second objects.

Optionally, the apparatus further includes:

a third execution unit, configured to perform a second operation, where the second operation includes at least one of the following:

generating the policy information of the first privacy protection operation;

sending the policy information of the first privacy protection operation to a fourth communications device; and sending the policy information of the first privacy protection operation to a second communications device.

Optionally, the policy information of the first privacy protection operation includes at least one of the following:

description information of a target object;

a privacy protection direction used to perform a privacy protection operation on information and/or data conforming to the privacy protection direction;

a privacy protection removal direction used to perform a privacy protection removal operation on information and/or data conforming to the privacy protection removal direction; and an algorithm for the first privacy protection operation, where the target object includes at least one of the following: a terminal, a target service, target information, target data, a target data channel, and a target computing task;

the description information of the target object includes at least one of the following: description information of the terminal, description information of the target service, description information of the target information, description information of the target data, description information of the target data channel, and description information of the target computing task;

the target object is the same as or different from a second object; and the target object is the same as or different from a first object.

Optionally, the first privacy protection operation includes at least one of the following:

a privacy protection operation; and a privacy protection removal operation.

Optionally, the privacy protection operation includes at least one of the following:

encrypting information and/or data;

performing integrity protection on information and/or data;

scrambling information and/or data; and processing information and/or data by using a privacy protection algorithm;

and/or the privacy protection removal operation includes at least one of the following:
decrypting information and/or data;
performing integrity protection removal on information and/or data;
descrambling information and/or data; and
performing privacy protection removal on information and/or data on which privacy protection has been performed.

Optionally, the first request information includes at least one of the following:
first indication information, where the first indication information is used to request to perform the first privacy protection operation on information and/or data of a first object;
description information of the first object; and
a direction in which the first privacy protection operation is requested, where the direction in which the first privacy protection operation is requested is used to request to perform the first privacy protection operation on information and/or data conforming to the direction in which the first privacy protection operation is requested, where
the first object includes at least one of the following: a terminal, a first service, first information, first data, a first data channel, and a first computing task; and
the description information of the target object includes at least one of the following: description information of the terminal, description information of the first service, description information of the first information, description information of the first data, description information of the first data channel, and description information of the first computing task.

Optionally, the subscription information related to the first privacy protection operation includes at least one of the following:
allowing and/or requiring first privacy protection;
not allowing and/or not requiring first privacy protection;
description information of an object allowing and/or requiring first privacy protection; and
description information of an object not allowing and/or not requiring first privacy protection.

Optionally, the apparatus further includes:
a third sending unit, configured to send third request information, where the third request information is used to request the subscription information related to the first privacy protection operation.

In this embodiment of this application, policy information of a first privacy protection operation is determined according to second information, so that privacy protection can be performed by a communications network.

The information privacy protection apparatus in this embodiment of this application may be an apparatus, or may be a component, an integrated circuit, or a chip in a terminal. The apparatus may be a mobile terminal, or a non-mobile terminal.

For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The information privacy protection apparatus in this embodiment of this application may be an apparatus with an operating system. The operating system may be an Android (Android) operating system, an iOS operating system, or another possible operating system. This is not specifically limited in this embodiment of this application.

The information privacy protection apparatus provided in this embodiment of this application can implement the processes implemented in the method embodiment in FIG. 4, and achieve a same technical effect. To avoid repetition, details are not described herein again.

Figure 14:
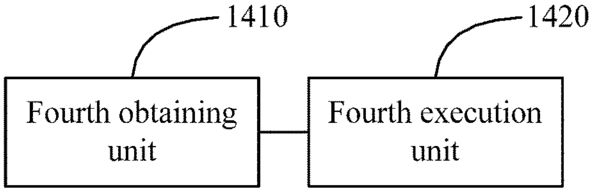
FIG. 14 is a fourth schematic structural diagram of an information privacy protection apparatus according to an embodiment of this application.

FIG. 14 is a fourth schematic structural diagram of an information privacy protection apparatus according to an embodiment of this application. The apparatus is applied to a fourth communications device, and the apparatus includes:
a fourth obtaining unit 1410, configured to obtain policy information of a first privacy protection operation; and
a fourth execution unit 1420, configured to perform a third operation according to the policy information of the first privacy protection operation, where
the third operation includes at least one of the following:
installing the policy information of the first privacy protection operation; and
performing the first privacy protection operation on information and/or data related to a terminal.

Optionally, the policy information of the first privacy protection operation includes at least one of the following:
description information of a target object;
a privacy protection direction used to perform a privacy protection operation on information and/or data conforming to the privacy protection direction;
a privacy protection removal direction used to perform a privacy protection removal operation on information and/or data conforming to the privacy protection removal direction; and
an algorithm for the first privacy protection operation, where
the target object includes at least one of the following: a terminal, a target service, target information, target data, a target data channel, and a target computing task;
the description information of the target object includes at least one of the following: description information of the terminal, description information of the target service, description information of the target information, description information of the target data, description information of the target data channel, and description information of the target computing task;
the target object is the same as or different from a second object; and
the target object is the same as or different from a first object.

Optionally, the performing the first privacy protection operation on information and/or data related to a terminal includes at least one of the following:
performing a privacy protection operation on information and/or data of a target object according to an algorithm for the first privacy protection operation;
performing a privacy protection removal operation on the information and/or the data of the target object according to the algorithm for the first privacy protection operation;
performing a privacy protection operation on information and/or data, conforming to a privacy protection direction, of the target object according to the algorithm for the first privacy protection operation;
performing a privacy protection removal operation on information and/or data, conforming to a privacy protection removal direction, of the target object according to the algorithm for the first privacy protection operation;

performing a privacy protection operation on information and/or data in an uplink direction of the target object according to the algorithm for the first privacy protection operation; and performing a privacy protection removal operation on information and/or data in a downlink direction of the target object according to the algorithm for the first privacy protection operation.

Optionally, the apparatus further includes:

a fourth sending unit, configured to perform at least one of the following:

sending, to a first target end, information and/or data on which privacy protection has been performed;

sending, to a second target end, information and/or data on which privacy protection removal has been performed;

sending information and/or data, on which privacy protection has been performed, of a target object to a privacy protection direction; and sending information and/or data on which privacy protection removal has been performed to a privacy protection removal direction.

In this embodiment of this application, a first privacy protection operation is performed according to policy information of the first privacy protection operation, so that privacy protection can be performed by a communications network.

The information privacy protection apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The information privacy protection apparatus in this embodiment of this application may be an apparatus with an operating system. The operating system may be an Android operating system, an iOS operating system, or another possible operating system. This is not specifically limited in this embodiment of this application.

The information privacy protection apparatus provided in this embodiment of this application can implement the processes implemented in the method embodiment in FIG. 5, and achieve a same technical effect. To avoid repetition, details are not described herein again.

Figure 15:
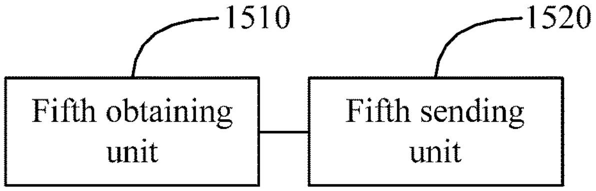
FIG. 15 is a fifth schematic structural diagram of an information privacy protection apparatus according to an embodiment of this application.

FIG. 15 is a fifth schematic structural diagram of an information privacy protection apparatus according to an embodiment of this application. The apparatus is applied to a fifth communications device, and the apparatus includes:

a fifth obtaining unit 1510, configured to obtain third request information, where the third request information is used to request subscription information related to a first privacy protection operation; and a fifth sending unit 1520, configured to send, according to the third request information, the subscription information related to the first privacy protection operation.

Optionally, the subscription information related to the first privacy protection operation includes at least one of the following:

allowing and/or requiring first privacy protection;

not allowing and/or not requiring first privacy protection;

description information of an object allowing and/or requiring first privacy protection; and description information of an object not allowing and/or not requiring first privacy protection.

In an implementation, the subscription information of the first privacy protection operation is subscription information of a terminal, a service provider, and/or a third party to the first privacy protection operation.

In this embodiment of this application, subscription information related to a first privacy protection operation is sent to a second communications device or a third communications device, so that privacy protection can be performed by a communications network.

The information privacy protection apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The information privacy protection apparatus in this embodiment of this application may be an apparatus with an operating system. The operating system may be an Android (Android) operating system, an iOS operating system, or another possible operating system. This is not specifically limited in this embodiment of this application.

The information privacy protection apparatus provided in this embodiment of this application can implement the processes implemented in the method embodiment in FIG. 6, and achieve a same technical effect. To avoid repetition, details are not described herein again.

Figure 16:
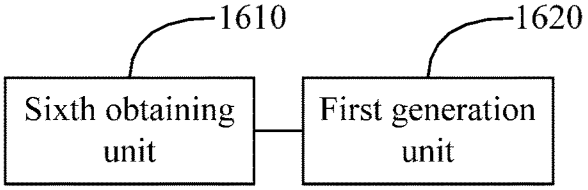
FIG. 16 is a sixth schematic structural diagram of an information privacy protection apparatus according to an embodiment of this application.

FIG. 16 is a sixth schematic structural diagram of an information privacy protection apparatus according to an embodiment of this application. The apparatus is applied to a sixth communications device, and the apparatus includes:

a sixth obtaining unit 1610, configured to obtain first privacy protection service support indication information; and a first generation unit 1620, configured to generate first request information according to the first privacy protection service support indication information, where the first request information is used to request to perform a first privacy protection operation on information and/or data related to a terminal.

Optionally, the apparatus further includes:

a sixth sending unit, configured to send capability information of the terminal, where the capability information of the terminal is used to indicate that the terminal has a capability of performing privacy protection on information and/or data, or that the terminal has no capability of performing privacy protection on information and/or data.

In this embodiment of this application, first request information is generated according to first privacy protection service support indication information, so that privacy protection can be performed by a communications network.

The information privacy protection apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The information privacy protection apparatus in this embodiment of this application may be an apparatus with an operating system. The operating system may be an Android operating system, an iOS operating system, or another possible operating system. This is not specifically limited in this embodiment of this application.

The information privacy protection apparatus provided in this embodiment of this application can implement the processes implemented in the method embodiment in FIG. 7, and achieve a same technical effect. To avoid repetition, details are not described herein again.

Figure 17:
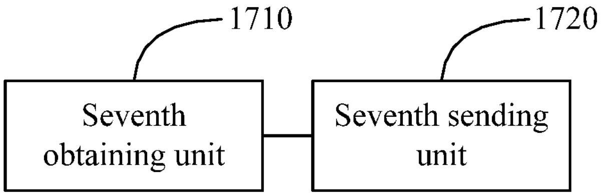
FIG. 17 is a seventh schematic structural diagram of an information privacy protection apparatus according to an embodiment of this application.

FIG. 17 is a seventh schematic structural diagram of an information privacy protection apparatus according to an embodiment of this application. The apparatus is applied to a seventh communications device, and the apparatus includes:

a seventh obtaining unit 1710, configured to obtain first privacy protection start information; and a seventh sending unit 1720, configured to send information and/or data according to the first privacy protection start information, where the first privacy protection start information includes at least one of the following: indication information used to indicate that first privacy protection starts, and the description information of the target object protected by first privacy protection;

the target object includes at least one of the following: a terminal, a target service, target information, target data, a target data channel, and a target computing task; and the description information of the target object includes at least one of the following: description information of the terminal, description information of the target service, description information of the target information, description information of the target data, description information of the target data channel, and description information of the target computing task.

Optionally, the seventh sending unit is configured to:

send information and/or data of the target object according to the first privacy protection start information.

In this embodiment of this application, information and/or data of a target object are/is sent according to first privacy protection start information, so that privacy protection can be performed by a communications network.

The information privacy protection apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The information privacy protection apparatus in this embodiment of this application may be an apparatus with an operating system. The operating system may be an Android operating system, an iOS operating system, or another possible operating system. This is not specifically limited in this embodiment of this application.

The information privacy protection apparatus provided in this embodiment of this application can implement the processes implemented in the method embodiment in FIG. 8, and achieve a same technical effect. To avoid repetition, details are not described herein again.

Figure 18:
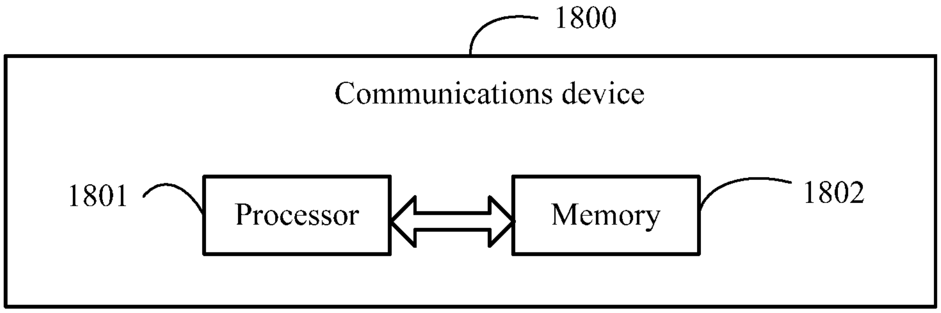
FIG. 18 is a schematic structural diagram of a communications device according to an embodiment of this application.

Optionally, as shown in FIG. 18, an embodiment of this application further provides a communications device 1800, including a processor 1801, a memory 1802, and a program or an instruction that is stored in the memory 1802 and that can be run on the processor 1801. For example, when the communications device 1800 is a terminal, the program or the instruction is executed by the processor 1801 to implement the processes of the foregoing information privacy protection method embodiment, and a same technical effect can be achieved. When the communications device 1800 is a network side device, the program or the instruction is executed by the processor 1801 to implement the processes of the foregoing information privacy protection method embodiment, and a same technical effect can be achieved. To avoid repetition, details are not described herein again.

Figure 19:
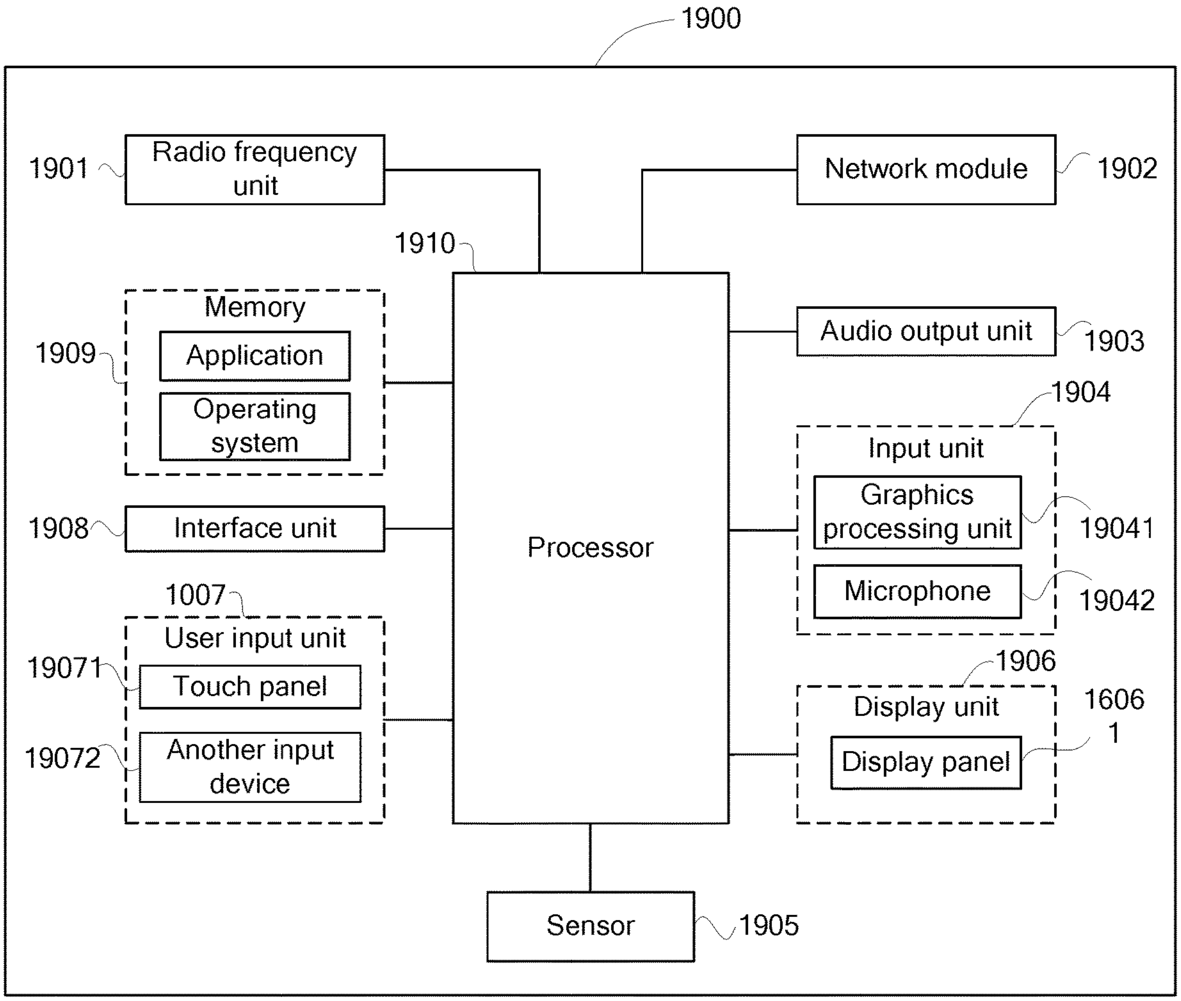
FIG. 19 is a schematic structural diagram of hardware of a terminal according to an embodiment of this application.

FIG. 19 is a schematic structural diagram of hardware of a terminal according to an embodiment of this application.

A terminal 1900 includes but is not limited to components such as a radio frequency unit 1901, a network module 1902, an audio output unit 1903, an input unit 1904, a sensor 1905, a display unit 1906, a user input unit 1907, an interface unit 1908, a memory 1909, and a processor 1910.

A person skilled in the art can understand that the terminal 1900 may further include a power supply (such as a battery) that supplies power to each component. The power supply may be logically connected to the processor 1910 by using a power supply management system, to implement functions such as charging and discharging management, and power consumption management by using the power supply management system. The terminal structure shown in FIG. 19 constitutes no limitation on the terminal, and the terminal may include more or fewer components than those shown in the figure, or combine some components, or have different component arrangements. Details are not described herein.

It should be understood that, in this embodiment of this application, the input unit 1904 may include a graphics processing unit (GPU) 19041 and a microphone 19042, and the graphics processing unit 19041 processes image data of a still picture or a video obtained by an image capture apparatus (such as a camera) in a video capture mode or an image capture mode. The display unit 1906 may include a display panel 19061. Optionally, the display panel 19061 may be configured in a form such as a liquid crystal display or an organic light-emitting diode. The user input unit 1907 includes a touch panel 19071 and another input device 19072. The touch panel 19071 is also referred to as a touchscreen. The touch panel 19071 may include two parts: a touch detection apparatus and a touch controller. The another input device 19072 may include but is not limited to a physical keyboard, a functional button (such as a volume control button or a power on/off button), a trackball, a mouse, and a joystick. Details are not described herein.

In this embodiment of this application, the radio frequency unit 1901 receives downlink data from a network side device and then sends the downlink data to the processor 1910 for processing; and sends uplink data to the network side device. Usually, the radio frequency unit 1901 includes but is not limited to an antenna, at least one amplifier, a transceiver, a coupler, a low noise amplifier, a duplexer, and the like.

The memory 1909 may be configured to store a software program or an instruction and various data. The memory 1909 may mainly include a program or instruction storage area and a data storage area. The program or instruction storage area may store an operating system, and an application or an instruction required by at least one function (for example, a sound playing function or an image playing function). In addition, the memory 1909 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 1910 may include one or more processing units. Optionally, an application processor and a modem processor may be integrated into the processor 1910. The application processor mainly processes an operating system, a user interface, an application, an instruction, or the like. The modem processor mainly processes wireless communications, for example, a baseband processor. It can be understood that, alternatively, the modem processor may not be integrated into the processor 1910.

The radio frequency unit 1901 is configured to send first information, where the first information includes at least one of the following: first request information, where the first request information is used to request to perform a first privacy protection operation on information and/or data related to a terminal;

capability information of the terminal, where the capability information of the terminal is used to indicate that the terminal has a capability of performing privacy protection on information and/or data, or that the terminal has no capability of performing privacy protection on information and/or data; and privacy protection indication information, where the privacy protection indication information is used to indicate that privacy protection has been performed on the information and/or the data related to the terminal, or is used to indicate that no privacy protection has been performed on the information and/or the data related to the terminal.

In this embodiment of this application, a terminal sends first information, where the first information reflects at least one of an object on which first privacy protection is to be performed, whether the terminal has a privacy protection capability, and whether privacy protection has been performed on information and/or data related to the terminal, so that privacy protection can be performed by a communications network.

Optionally, the radio frequency unit 1901 is further configured to send the first request information in a case that a first condition is met, where the first condition includes at least one of the following: information and/or data of a first object need/needs to be disclosed to a first target end;

the information and/or the data of the first object need/needs to be sent to the first target end for computing;

a network supports performing the first privacy protection operation on the information and/or the data related to the terminal; and the terminal allows the network to perform the first privacy protection operation on the information and/or the data related to the terminal.

Optionally, the radio frequency unit 1901 is further configured to:

obtain first response information and/or first privacy protection start information; and perform one of the following according to the first response information and/or the first privacy protection start information:

sending information and/or data of a first object; and sending information and/or data of a target object, where the first response information includes at least one of the following: a success response to the first request information, and description information of the target object protected by first privacy protection;

the first privacy protection start information includes at least one of the following: indication information used to indicate that first privacy protection starts, and the description information of the target object protected by first privacy protection;

the target object includes at least one of the following: a terminal, a target service, target information, target data, a target data channel, and a target computing task;

the description information of the target object includes at least one of the following: description information of the terminal, description information of the target service, description information of the target information, description information of the target data, description information of the target data channel, and description information of the target computing task; and the target object is the same as or different from the first object.

In this embodiment of this application, after obtaining first response information and/or first privacy protection start information, a terminal sends related information and/or data, so that privacy protection can be performed by a communications network. In this way, privacy can be protected while reducing complexity and a transmission amount of a data source.

In some optional embodiments, the processor 1910 is configured to: obtain first privacy protection service support indication information; and generate first request information according to the first privacy protection service support indication information, where the first request information is used to request to perform a first privacy protection operation on information and/or data related to a terminal.

Optionally, the radio frequency unit 1901 is configured to send capability information of the terminal, where the capability information of the terminal is used to indicate that the terminal has a capability of performing privacy protection on information and/or data, or that the terminal has no capability of performing privacy protection on information and/or data.

In this embodiment of this application, a terminal generates first request information according to first privacy protection service support indication information, so that privacy protection can be performed by a communications network.

In some optional embodiments, the processor 1910 is configured to: obtain first privacy protection start information; and send information and/or data of a target object according to the first privacy protection start information, where the first privacy protection start information includes at least one of the following: indication information used to indicate that first privacy protection starts, and the description information of the target object protected by first privacy protection;

the target object includes at least one of the following: a terminal, a target service, target information, target data, a target data channel, and a target computing task; and the description information of the target object includes at least one of the following: description information of the terminal, description information of the target service, description information of the target information, description information of the target data, description information of the target data channel, and description information of the target computing task.

In this embodiment of this application, a terminal sends information and/or data of a target object according to first privacy protection start information, so that privacy protection can be performed by a communications network.

Figure 20:
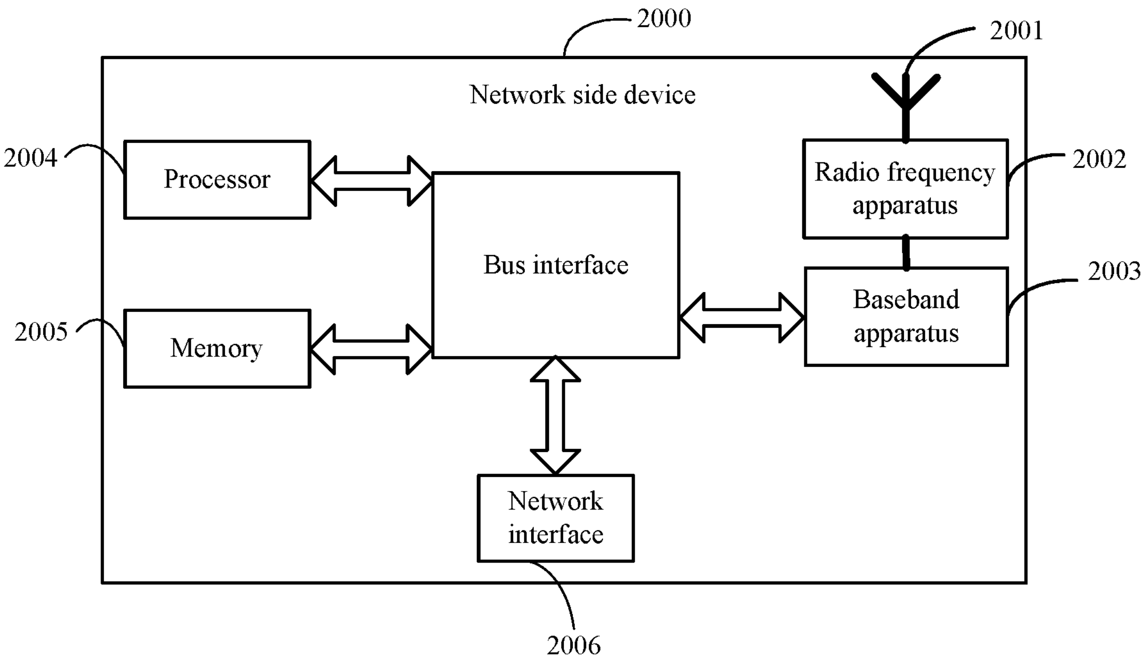
FIG. 20 is a schematic structural diagram of hardware of a network side device according to an embodiment of this application.

An embodiment of this application further provides a network side device. As shown in FIG. 20, a network device 2000 includes an antenna 2001, a radio frequency apparatus 2002, and a baseband apparatus 2003. The antenna 2001 is connected to the radio frequency apparatus 2002. In an uplink direction, the radio frequency apparatus 2002 receives information by using the antenna 2001, and sends the received information to the baseband apparatus 2003 for processing. In a downlink direction, the baseband apparatus 2003 processes to-be-sent information, and sends the information to the radio frequency apparatus 2002. The radio frequency apparatus 2002 processes the received information and then sends the information by using the antenna 2001.

The frequency band processing apparatus may be located in the baseband apparatus 2003. The method performed by the network side device in the foregoing embodiment may be implemented in the baseband apparatus 2003. The baseband apparatus 2003 includes a processor 2004 and a memory 2005.

The baseband apparatus 2003 may include, for example, at least one baseband board, where a plurality of chips are disposed on the baseband board. As shown in FIG. 20, one chip is, for example, the processor 2004, which is connected to the memory 2005, so as to invoke a program in the memory 2005 to perform operations of the network device shown in the foregoing method embodiment.

The baseband apparatus 2003 may further include a network interface 2006, configured to exchange information with the radio frequency apparatus 2002. For example, the interface is a common public radio interface (CPRI).

Alternatively, the network side device in this embodiment of the present application further includes an instruction or a program that is stored in the memory 2005 and that can be run on the processor 2004. The processor 2004 invokes the instruction or the program in the memory 2005 to perform the method performed by the modules of the information privacy protection apparatus shown in any one of FIG. 11 to FIG. 15, and a same technical effect is achieved. To avoid repetition, details are not described herein again.

An embodiment of this application further provides a readable storage medium. The readable storage medium may be non-volatile or volatile. The readable storage medium stores a program or an instruction, and the program or the instruction is executed by a processor to implement the processes of the foregoing information privacy protection method embodiment, and a same technical effect can be achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing information privacy protection method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer software product. The computer software product is stored in a non-transitory readable storage device, and the computer software product is executed by at least one processor to implement the processes of the foregoing method embodiment shown in any one of FIG. 2 to FIG. 8, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An information privacy protection method performed by a first communications device, the first communications device being a terminal, comprising:

sending first information, wherein the first information comprises at least one of the following: first request information, wherein the first request information is used to request to perform a first privacy protection operation on at least one of information or data of a first object;

capability information of the terminal, wherein the capability information of the terminal is used to indicate that the terminal has a capability of performing a privacy protection operation on at least one of information or data, or that the terminal has no capability of performing the privacy protection operation on at least one of information or data; and privacy protection indication information, wherein the privacy protection indication information is used to indicate that the privacy protection operation has been performed on the at least one of information or data of the first object, or is used to indicate that no privacy protection operation has been performed on the at least one of information or data of the first object;

the first privacy protection operation comprises at least one of the following:

the privacy protection operation; and a privacy protection removal operation, wherein the privacy protection operation comprises at least one of the following:

encrypting at least one of information or data;

performing integrity protection on at least one of information or data;

scrambling at least one of information or data; and processing at least one of information or data by using a privacy protection algorithm; or the privacy protection removal operation comprises at least one of the following:

decrypting at least one of information or data;

performing integrity protection removal on at least one of information or data;

descrambling at least one of information or data; and performing privacy protection removal on at least one of information or data which is processed by using a privacy protection algorithm, wherein after the step of sending first information, the method further comprises at least one of the following:

obtaining at least one of first response information or first privacy protection start information; and sending at least one of information or data of a target object according to the at least one of first response information or first privacy protection start information, wherein the first response information comprises description information of the target object to be protected by the first privacy protection operation; or the first privacy protection start information comprises the description information of the target object to be protected by the first privacy protection operation;

wherein the target object comprises at least one of the following: a terminal, a target service, target information, target data, a target data channel, or a target computing task;

the description information of the target object comprises at least one of the following: description information of the terminal, description information of the target service, description information of the target information, description information of the target data, description information of the target data channel, or description information of the target computing task; and the target object is the same as or different from the first object.

2. The method according to claim 1, wherein the first request information comprises at least one of the following:

first indication information, wherein the first indication information is used to request to perform the first privacy protection operation on the at least one of information or data of the first object;

description information of the first object; and a direction in which the first privacy protection operation is requested, wherein the direction in which the first privacy protection operation is requested is used to request to perform the first privacy protection operation on at least one of information or data conforming to the direction in which the first privacy protection operation is requested, wherein the first object comprises at least one of the following: a terminal, a first service, first information, first data, a first data channel, and a first computing task; and the description information of the first object comprises at least one of the following: description information of the terminal, description information of the first service, description information of the first information, description information of the first data, description information of the first data channel, and description information of the first computing task;

the direction in which the first privacy protection operation is requested comprises at least one of the following: uplink or downlink.

3. The method according to claim 2, wherein the direction in which the first privacy protection operation is requested comprises at least one of the following:

a direction in which the privacy protection operation is requested, to request to perform the privacy protection operation on at least one of information or data conforming to the direction in which the privacy protection operation is requested; and a direction in which the privacy protection removal operation is requested, to request to perform the privacy protection removal operation on at least one of information or data conforming to the direction in which the privacy protection removal operation is requested.

4. The method according to claim 1, wherein the sending first information comprises:

sending the first request information in a case that a first condition is met, wherein the first condition comprises at least one of the following:

the at least one of information or data of the first object needs to be disclosed to a first target end;

the at least one of information or the data of the first object needs to be sent to the first target end for computing;

a network supports performing the first privacy protection operation on the at least one of information or data of the first object; and the terminal allows the network to perform the first privacy protection operation on the at least one of information or data of the first object.

5. The method according to claim 1, wherein after the step of sending first information, the method further comprises:

sending the at least one of information or data of the first object according to the at least one of first response information or the first privacy protection start information; wherein the first response information further comprises a success response to the first request information; or the first privacy protection start information further comprises indication information used to indicate that first privacy protection starts.

6. An information privacy protection method performed by a second communications device, comprising:

obtaining at least one of first information or subscription information related to a first privacy protection operation; and determining, according to the at least one of first information or subscription information related to the first privacy protection operation, to send second request information or not to send second request information, wherein the second request information is used to request policy information of the first privacy protection operation; and the first information comprises at least one of the following:

first request information, wherein the first request information is used to request to perform the first privacy protection operation on at least one of information or data of a first object;

capability information of the terminal, wherein the capability information of the terminal is used to indicate that the terminal has a capability of performing a privacy protection operation on at least one of information or data, or that the terminal has no capability of performing the privacy protection operation on at least one of information or data; and privacy protection indication information, wherein the privacy protection indication information is used to indicate that the privacy protection operation has been performed on the at least one of information or data of a first object, or is used to indicate that no privacy protection operation has been performed on the at least one of information or data of a first object;

the first privacy protection operation comprises at least one of the following:

the privacy protection operation; and a privacy protection removal operation, wherein the privacy protection operation comprises at least one of the following:

encrypting at least one of information or data;

performing integrity protection on at least one of information or data;

scrambling at least one of information or data; and processing at least one of information or data by using a privacy protection algorithm; or the privacy protection removal operation comprises at least one of the following:

decrypting at least one of information or data;

performing integrity protection removal on at least one of information or data;

descrambling at least one of information or data; and performing privacy protection removal on at least one of information or data which is processed by using a privacy protection algorithm, wherein the method further comprises:

receiving policy information of the first privacy protection operation; and performing a first operation according to the policy information of the first privacy protection operation, wherein the first operation comprises sending at least one of first response information or first privacy protection start information to a second target end that performs an operation of sending at least one of information or data of a second object, wherein the first response information comprises description information of a target object to be protected by the first privacy protection operation; or the first privacy protection start information comprises the description information of the target object to be protected by the first privacy protection operation;

wherein the target object comprises at least one of the following: a terminal, a target service, target information, target data, a target data channel, or a target computing task;

the description information of the target object comprises at least one of the following: description information of the terminal, description information of the target service, description information of the target information, description information of the target data, description information of the target data channel, or description information of the target computing task; and the target object is the same as or different from the second object.

7. The method according to claim 6, wherein the subscription information related to the first privacy protection operation comprises at least one of the following:

at least one of allowing the first privacy protection operation or requiring the first privacy protection operation;

at least one of not allowing the first privacy protection operation or not requiring the first privacy protection operation;

description information of at least one of an object allowing the first privacy protection operation or an object requiring the first privacy protection operation; and description information of at least one of an object not allowing the first privacy protection operation or an object not requiring the first privacy protection operation.

8. The method according to claim 6, wherein the determining to send second request information comprises:

in a case that a second condition is met, determining to send the second request information, wherein the second condition comprises at least one of the following:

the subscription information related to the first privacy protection operation allows the first privacy protection operation to be performed on the at least one of information or data of the first object;

the subscription information related to the first privacy protection operation has an object allowing the first privacy protection operation;

the terminal does not have a capability of performing the privacy protection operation on at least one of information or data;

no privacy protection operation is performed on the at least one of information or data of the first object;

the first request information is obtained; and the subscription information related to the first privacy protection operation allows the first privacy protection operation to be performed on at least one of information or data of all or some first objects.

9. The method according to claim 6, wherein the second request information comprises at least one of the following:

second indication information, wherein the second indication information is used to request to perform the first privacy protection operation on at least one of information or data related to the second object;

description information of the second object; and
a direction in which the first privacy protection operation is requested, wherein the direction in which the first privacy protection operation is requested is used to request to perform the first privacy protection operation on at least one of information or data conforming to the direction in which the first privacy protection operation is requested, wherein
the second object comprises at least one of the following: a terminal, a second service, second information, second data, a second data channel, and a second computing task;
the description information of the second object comprises at least one of the following: description information of the terminal, description information of the second service, description information of the second information, description information of the second data, description information of the second data channel, and description information of the second computing task; and
the second object comprises one of the following: the first object; an object that is in the first object and on which the subscription information related to the first privacy protection operation allows the first privacy protection operation to be performed; and an object on which the subscription information related to the first privacy protection operation allows the first privacy protection operation to be performed;
the direction in which the first privacy protection operation is requested comprises at least one of the following: uplink or downlink.

10. The method according to claim 9, wherein the direction in which the first privacy protection operation is requested comprises at least one of the following:
a direction in which privacy protection is requested, to request to perform a privacy protection operation on at least one of information or data conforming to the direction in which privacy protection is requested; and
a direction in which privacy protection removal is requested, to request to perform a privacy protection removal operation on at least one of information or data conforming to the direction in which privacy protection removal is requested.

11. The method according to claim 6, wherein:
the first operation further comprises at least one of the following:
generating policy information used for the first privacy protection operation on a fourth communications device; or
sending, to the fourth communications device, the policy information used for the first privacy protection operation on the fourth communications device.

12. The method according to claim 11, wherein
the first response information further comprises a success response to the first request information;
or
the first privacy protection start information further comprises: indication information used to indicate that first privacy protection starts.

13. The method according to claim 6, further comprising:
sending third request information, wherein the third request information is used to request the subscription information related to the first privacy protection operation.

14. A network side device, comprising:
a memory, configured to store a program or an instruction; and
a processor,
wherein the program or the instruction, when executed by the processor, causes the network side device to perform the information privacy protection method according to claim 6.

15. A terminal, comprising:
a memory, configured to store a program or an instruction; and
a processor,
wherein the program or the instruction, when executed by the processor, causes the terminal to:
send first information, wherein
the first information comprises at least one of the following: first request information, wherein the first request information is used to request to perform a first privacy protection operation on at least one of information or data of a first object;
capability information of the terminal, wherein the capability information of the terminal is used to indicate that the terminal has a capability of performing a privacy protection operation on at least one of information or data, or that the terminal has no capability of performing the privacy protection operation on at least one of information or data; and
privacy protection indication information, wherein the privacy protection indication information is used to indicate that the privacy protection operation has been performed on the at least one of information or data of the first object, or is used to indicate that no privacy protection operation has been performed on the at least one of information or data of the first object;
the first privacy protection operation comprises at least one of the following:
the privacy protection operation; and
a privacy protection removal operation, wherein
the privacy protection operation comprises at least one of the following:
encrypting at least one of information or data;
performing integrity protection on at least one of information or data;
scrambling at least one of information or data; and
processing at least one of information or data by using a privacy protection algorithm; or
the privacy protection removal operation comprises at least one of the following:
decrypting at least one of information or data;
performing integrity protection removal on at least one of information or data;
descrambling at least one of information or data; and
performing privacy protection removal on at least one of information or data which is processed by using a privacy protection algorithm;
wherein after sending first information, the program or the instruction causes the terminal to further:
obtain at least one of first response information or first privacy protection start information; and
send at least one of information or data of a target object according to the at least one of first response information or first privacy protection start information, wherein
the first response information comprises description information of the target object to be protected by the first privacy protection operation; or
the first privacy protection start information comprises the description information of the target object to be protected by the first privacy protection operation;

wherein the target object comprises at least one of the following: a terminal, a target service, target information, target data, a target data channel, or a target computing task;

the description information of the target object comprises at least one of the following: description information of the terminal, description information of the target service, description information of the target information, description information of the target data, description information of the target data channel, or description information of the target computing task; and the target object is the same as or different from the first object.

16. The terminal according to claim 15, wherein the first request information comprises at least one of the following:

first indication information, wherein the first indication information is used to request to perform the first privacy protection operation on the at least one of information or data of the first object;

description information of the first object; and a direction in which the first privacy protection operation is requested, wherein the direction in which the first privacy protection operation is requested is used to request to perform the first privacy protection operation on at least one of information or data conforming to the direction in which the first privacy protection operation is requested, wherein the first object comprises at least one of the following: a terminal, a first service, first information, first data, a first data channel, and a first computing task; and the description information of the first object comprises at least one of the following: description information of the terminal, description information of the first service, description information of the first information, description information of the first data, description information of the first data channel, and description information of the first computing task;

the direction in which the first privacy protection operation is requested comprises at least one of the following: uplink or downlink.

17. The terminal according to claim 15, wherein the send first information comprises:

send the first request information in a case that a first condition is met, wherein the first condition comprises at least one of the following:

the at least one of information or data of the first object needs to be disclosed to a first target end;

the at least one of information or data of the first object needs to be sent to the first target end for computing;

a network supports performing the first privacy protection operation on the at least one of information or data of the first object; and the terminal allows the network to perform the first privacy protection operation on the at least one of information or data of the first object.

18. The terminal according to claim 15, wherein after sending first information, the program or the instruction, when executed by the processor, causes the terminal to:

send the at least one of information or data of the first object according to the at least one of first response information or first privacy protection start information; wherein the first response information further comprises a success response to the first request information; or the first privacy protection start information further comprises: indication information used to indicate that first privacy protection starts.

* * * * *